(12) United States Patent
Hashimoto et al.

(10) Patent No.: US 7,365,785 B2
(45) Date of Patent: Apr. 29, 2008

(54) ELECTRONIC CAMERA

(75) Inventors: Hitoshi Hashimoto, Sagamihara (JP); Takeshi Kindaichi, Hachioji (JP)

(73) Assignee: Olympus Corporation, Tokyo (JP)

( * ) Notice: Subject to any disclaimer, the term of this patent is extended or adjusted under 35 U.S.C. 154(b) by 840 days.

(21) Appl. No.: 10/681,087

(22) Filed: Oct. 7, 2003

(65) Prior Publication Data
US 2004/0165103 A1    Aug. 26, 2004

(30) Foreign Application Priority Data

| Oct. 11, 2002 | (JP) | ............................. 2002-299148 |
| Oct. 25, 2002 | (JP) | ............................. 2002-311537 |
| Oct. 25, 2002 | (JP) | ............................. 2002-311538 |

(51) Int. Cl.
H04N 5/335    (2006.01)
H01L 27/148    (2006.01)

(52) U.S. Cl. .................. 348/314; 257/230; 348/312; 348/322; 348/241; 348/221.1; 348/280; 348/282

(58) Field of Classification Search ................ 348/312, 348/314, 305, 333.11; 257/230, 231, 232; 358/482, 483
See application file for complete search history.

(56) References Cited
U.S. PATENT DOCUMENTS 4,556,911 A * 12/1985 Imaide et al. ................ 348/297

6,700,609 B1 * 3/2004 Abe ............................ 348/243
6,778,215 B1 * 8/2004 Nakashima et al. ........ 348/314
6,809,764 B1 * 10/2004 Misawa et al. ............. 348/272

FOREIGN PATENT DOCUMENTS

| JP | 5-211320 A | 8/1993 |
| JP | 2000-165758 A | 6/2000 |
| JP | 2001-238138 A | 8/2001 |

* cited by examiner

*Primary Examiner*—Ngoc-Yen Vu
*Assistant Examiner*—Adam L Henderson
(74) *Attorney, Agent, or Firm*—Frishauf, Holtz, Goodman & Chick, P.C.

(57) ABSTRACT

There is provided an electronic camera comprising an imaging element which photo-electrically converts an object field light, a timing generator including an internal register in which timing of a drive signal used to operate the imaging element can be programmed, a power supply control portion which supplies a second voltage to the imaging element when a predetermined time has elapsed after supply of a first voltage to the timing generator, and a control portion which starts at least program setting in the internal register of the timing generator after elapse of a time that the timing generator requires to operate stably at the first voltage and before elapse of a time that the imaging element requires to operate stably at the second voltage.

16 Claims, 25 Drawing Sheets

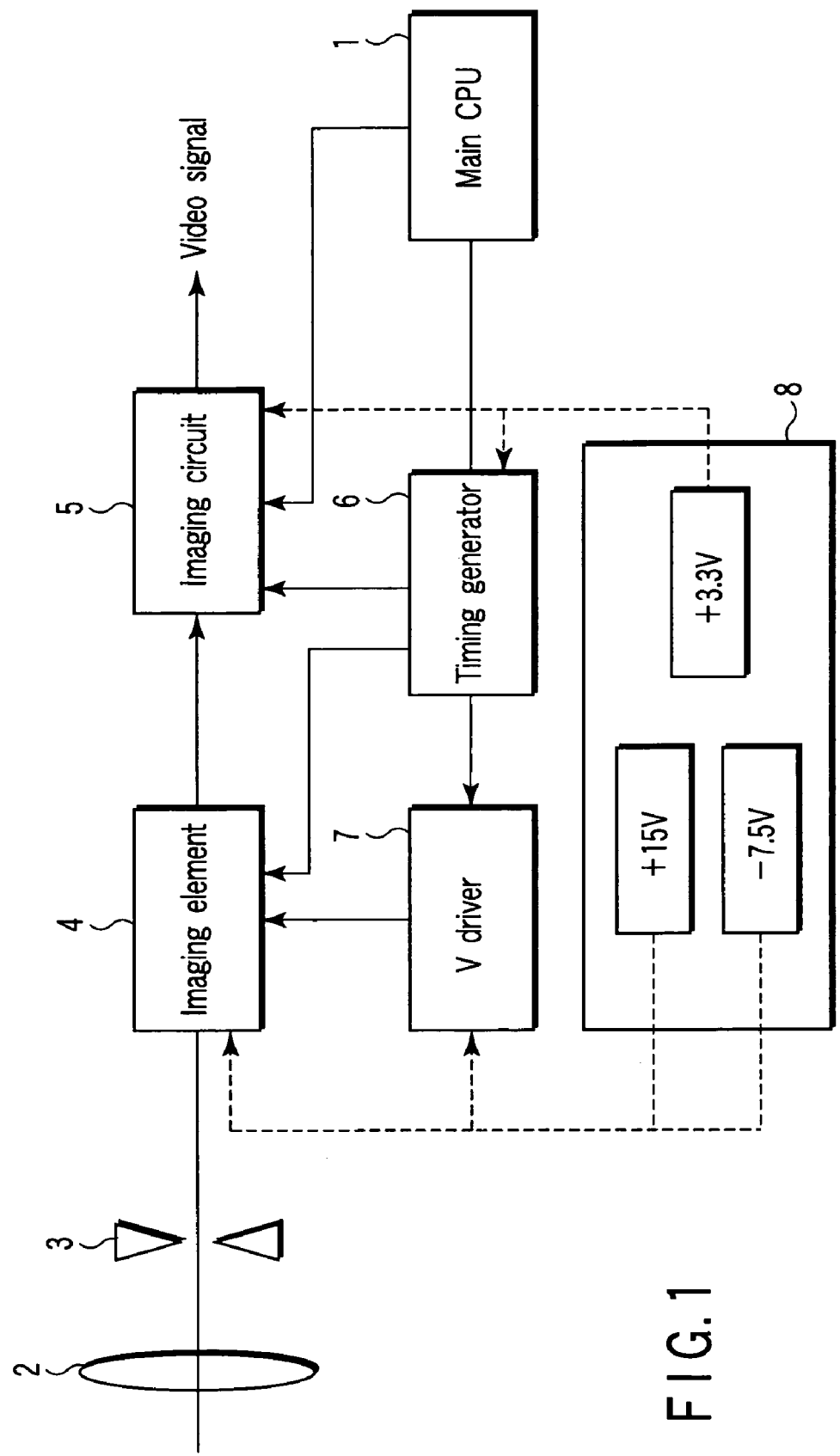
F I G. 1

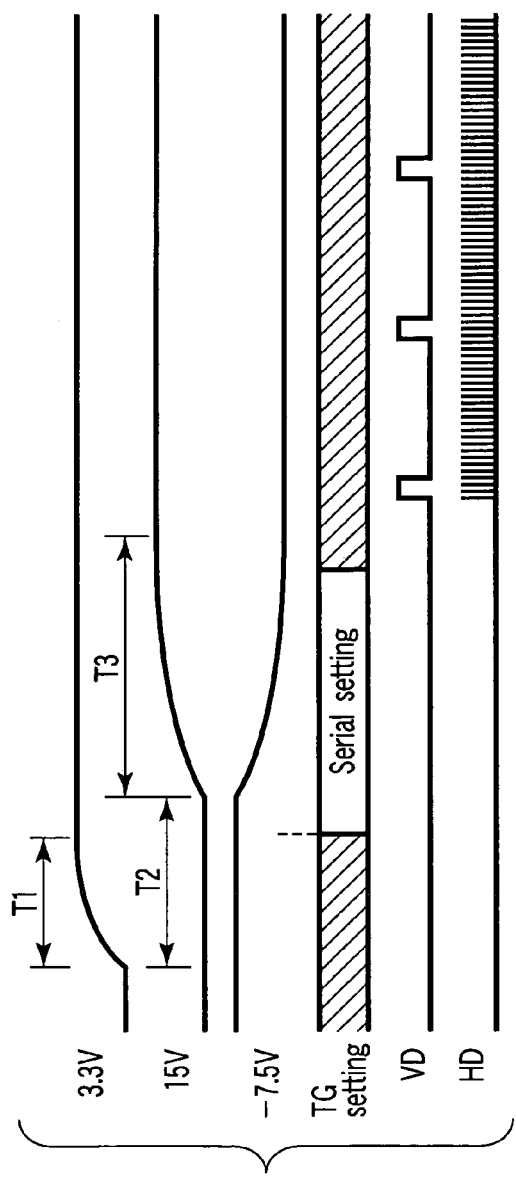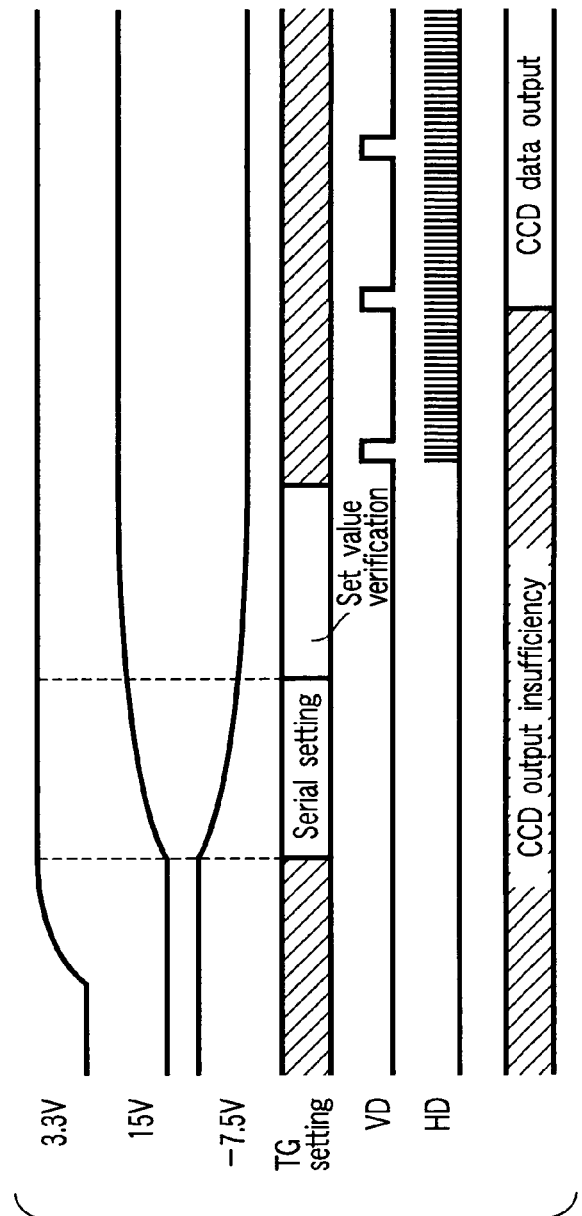

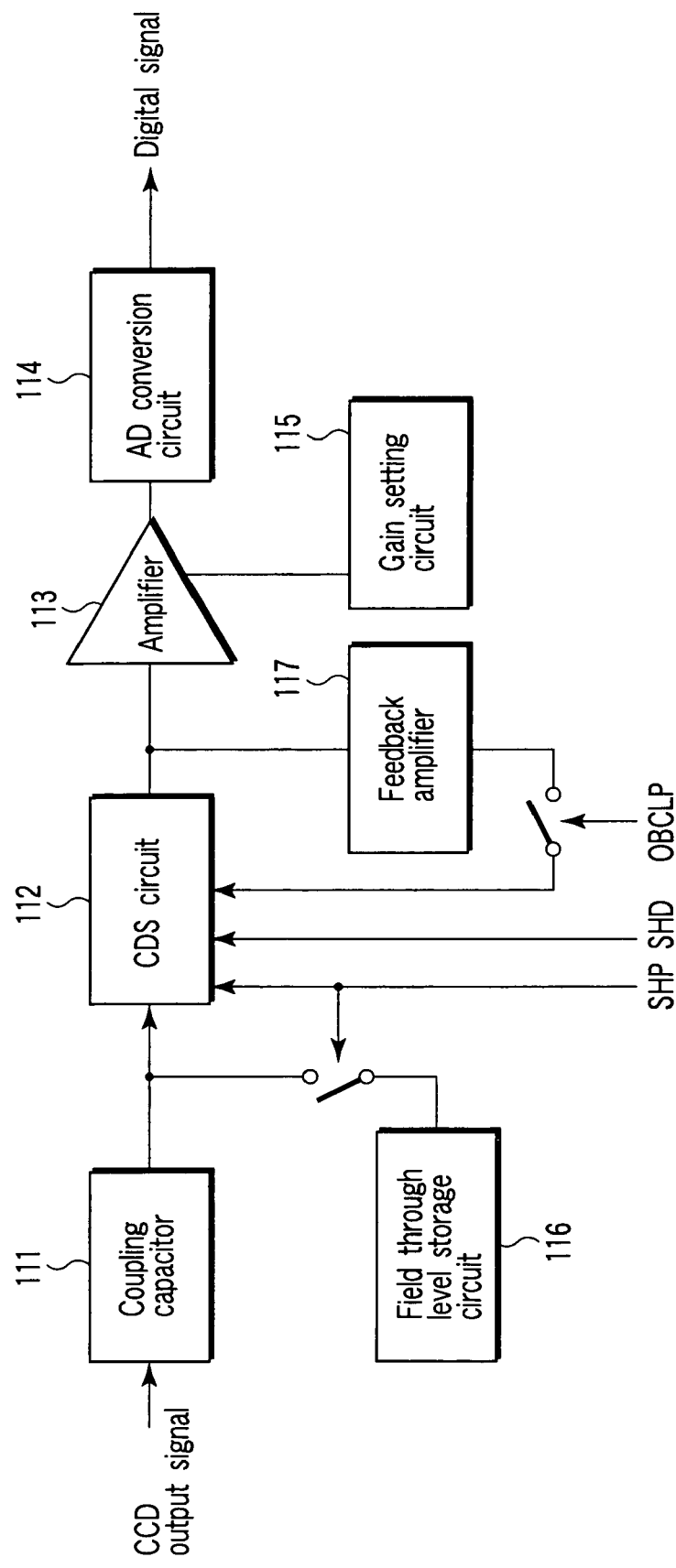
F I G. 14

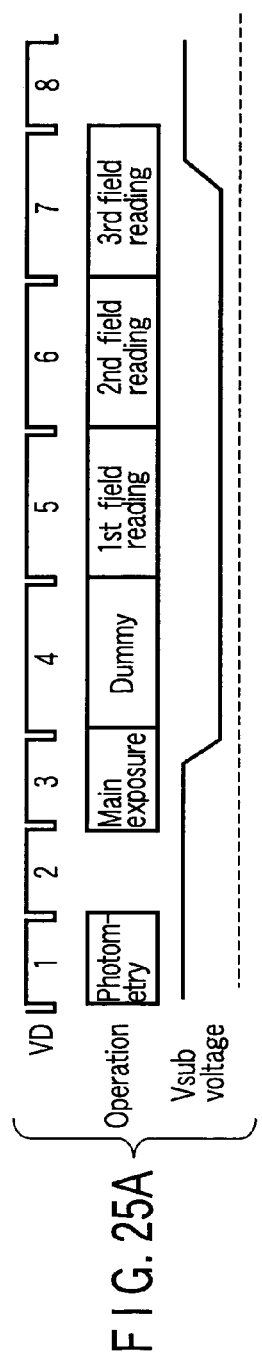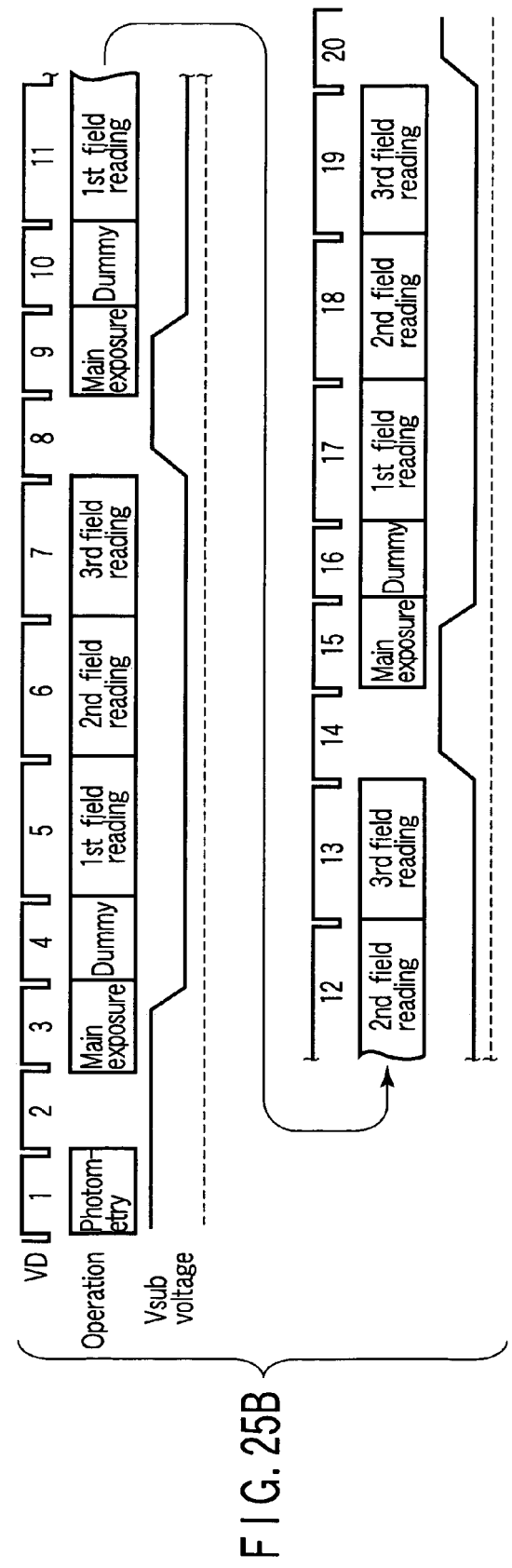
FIG. 25A
FIG. 25B

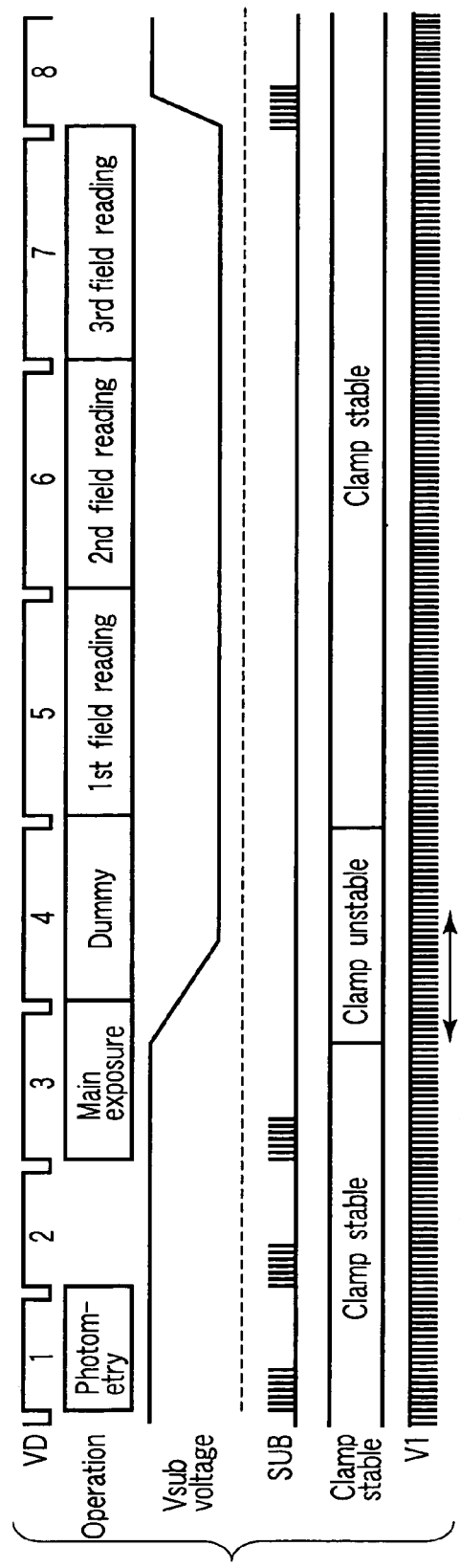
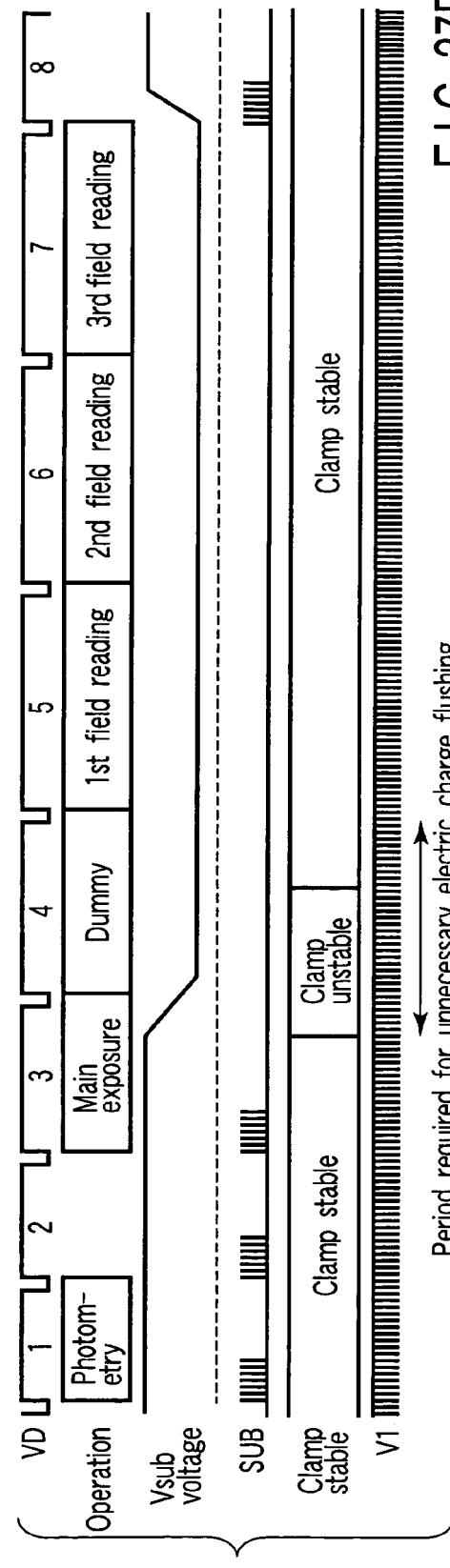

ELECTRONIC CAMERA

CROSS-REFERENCE TO RELATED APPLICATIONS

This application is based upon and claims the benefit of priority from the prior Japanese Patent Applications No. 2002-299148, filed Oct. 11, 2002; No. 2002-311537, filed Oct. 25, 2002; and No. 2002-311538, filed Oct. 25, 2002, the entire contents of all of which are incorporated herein by reference.

BACKGROUND OF THE INVENTION

1. Field of the Invention

The present invention relates to an electronic camera.

2. Description of the Related Art

A first prior art concerning an electronic camera is a technique which relates to a timing generator.

A circuit called a timing generator is used in an electronic camera. The timing generator generates a timing signal required for a CCD, an imaging circuit and others to operate.

This timing generator is conventionally produced based on a dedicated hardware logic according to a specification of an imaging element used in the electronic camera (Japanese patent application laid-open No. 2000-165758).

Under the circumstance in recent years that the imaging element is graded up in a short period, however, designing and manufacturing a new timing generator every time the imaging element is updated require a large amount of cost.

Thus, there is provided a general-purpose timing generator which incorporates a memory, and which can program values such as the timing-pulse cycle of timing signals and can generate timing signals that meet the specification of an imaging element.

However, in order to actually drive the imaging element, various timing pulses are required. Therefore, when supplying a timing pulse of the imaging element by using a general purpose type timing generator including an internal register capable of setting a program, cycles, levels, duties and the like of all the timing pulses must be set from the outside.

In a conventional dedicated timing generator in which a logic is constituted by using hardware, the number of internal registers which must be set from the outside is very small. Therefore, a time required for setting of the internal registers is ignorable, and a setting time is not a problem.

However, using the general purpose type timing generator including the internal registers capable of setting a program requires a very large amount of time which is several-tenfold of a setting time needed in the prior art. Therefore, if a setting operation of the internal registers is performed after each circuit such as a timing generator or an imaging element in an electronic camera is started like the prior art, a delay is produced in starting of the entire electronic camera, thereby causing a reduction in the operability.

A second prior art concerning an electronic camera is a technique which relates to switching of a substrate voltage.

In a conventional camera, there is used a technique which changes a handling electric charge quantity by switching a substrate voltage Vsub of an imaging element in accordance with an imaging condition of the electronic camera in order to obtain an imaging signal with a required resolution (Japanese patent application laid-open No. 5-211320).

The imaging element is configured in such a manner that electric charges are absorbed from a photosensitive element to a substrate side by, e.g., an overflow when electric charges which are more than a fixed quantity are generated in the photosensitive element, thereby preventing a reduction in blooming, smear or the like. Such a stored electric charge quantity in the photosensitive element as that the overflow is thereby started is called a handling electric charge quantity.

However, there is a problem that an image signal level fluctuates when the substrate voltage Vsub is switched, a signal processing circuit on a rear stage, especially a clamp processing circuit thereby erroneously operates, a noise is temporarily generated and signal shading is generated in an image.

Therefore, in order to avoid the signal shading in an image due to a clamp miss, preventing switching of the substrate voltage Vsub can be considered. However, increasing the handling electric charges by switching the substrate voltage Vsub as described above is required in order to obtain an image with less noises, and a possibility that an image quality is lowered due to blooming or the like is high when the substrate voltage Vsub is not switched.

A third prior art concerning an electronic camera is a technique which relates to an n:1 (n is a natural number not less than 3) interlace read type imaging element.

In a conventional electronic camera using a 2:1 interlace read type imaging element, unnecessary electric charges in a transfer path of the imaging element are flushed at a high speed, and the electric charges of each pixel are then read into the transfer path and transferred through the transfer path at a regular speed, thereby taking out signal electric charges (Japanese patent application laid-open No. 2000-165758).

Further, the conventional electronic camera adopts a technique by which the handling electric charges are controlled by switching the substrate voltage Vsub based on a monitor mode which is a mode for displaying a moving picture and a still mode which is a mode for taking a still picture in accordance with each shooting mode of the electronic camera in order to obtain an imaging signal with a required resolution.

Furthermore, these techniques can be likewise applied in an electronic camera using the n:1 (n is a natural number not less than 3) interlace read type imaging element.

In the n:1 (n is a natural number not less than 3) interlace read type imaging element, however, there is a problem that unnecessary electric charges remain when flushing is carried out at a high speed.

Moreover, in the n:1 (n is a natural number not less than 3) interlace read type imaging element, there is a problem that a clamp miss of a black level is generated due to switching of the substrate voltage Vsub and the signal shading is produced in an image.

BRIEF SUMMARY OF THE INVENTION

According to a first aspect of the present invention, there is provided an electronic camera comprising: an imaging element which photo-electrically converts an object field light; a timing generator including an internal register in which timing of a drive signal used to operate the imaging element can be programmed; a power supply control portion which supplies a second voltage to the imaging element when a predetermined time has elapsed after supply of a first voltage to the timing generator; and a control portion which starts at least program setting in the internal register of the timing generator after elapse of a time that the timing generator requires to operate stably at the first voltage and before elapse of a time that the imaging element requires to operate stably at the second voltage.

Additionally, according to a second aspect of the present invention, there is provided an electronic camera comprising: an imaging element which photo-electrically converts an object field light; a timing generator including an internal register in which timing of a drive signal used to operate the imaging element can be programmed; a power supply control portion which supplies a second voltage to the imaging element when a predetermined time has elapsed after supply of a first voltage to the timing generator; and a control portion which performs program setting in the internal register of the timing generator, reads and verifies a set value after elapse of a time that the timing generator requires to operate stably at the first voltage and before elapse of a time that the imaging element requires to operate stably at the second voltage.

Further, according to a third aspect of the present invention, there is provided an electronic camera comprising: an imaging element which can change a handling electric charge quantity of the imaging element; a voltage control portion which controls a substrate voltage used to change the handling electric charge quantity of the imaging element; a read portion which controls an operation to take out electric charges stored in each pixel of the imaging element and read them as an image signal to the outside; an amplification portion which amplifies the image signal read by the read portion; and a voltage control inhibition portion which inhibits a control over the substrate voltage by the voltage control portion when is an amplification factor of the amplification portion is not less than a predetermined value.

Furthermore, according to a fourth aspect of the present invention, there is provided an electronic camera comprising: an n:1 (n is a natural number not less than 3) interlace read type imaging element which can read electric charges of a plurality of two-dimensionally arranged photodiodes to the outside through a transfer path; an unnecessary electric charge flushing portion which transfers unnecessary electric charges stored in the transfer path at a regular speed through the transfer path; a signal read portion which reads the electric charges of the photodiodes to the outside of the imaging element after flushing the unnecessary electric charges; and a conversion portion which converts a signal read by the signal reading portion into a video signal, wherein the unnecessary electric charge flushing portion transfers the unnecessary electric charges stored in the transfer path at a regular speed through the transfer path after end of exposure of the imaging element and before the electric charges of the photodiodes are read to the transfer path.

Furthermore, according to a fifth aspect of the present invention, there is provided an electric camera comprising: an n:1 (n is a natural number not less than 3) interlace read type imaging element which can read electric charges of a plurality of two-dimensionally arranged photodiodes to the outside through a transfer path; an unnecessary electric charge flushing portion which transfers unnecessary electric charges stored in the transfer path at a regular speed through the transfer path; a signal read portion which reads the electric charges of the photodiodes to the outside of the imaging element after flushing the unnecessary electric charges; and a conversion portion which converts a signal read by the signal reading portion into a video signal, wherein the unnecessary electric charge flushing portion has a frame period in which the unnecessary electric charges stored in the transfer path are transferred through the transfer path at a regular path after end of exposure of the imaging element and before the electric charges of the photodiodes are read to the transfer path.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a structure of an electronic camera according to a first embodiment of the present invention;

FIG. 4 is a schematic time chart showing an initial operation from turning on the power supply of the electronic camera according to the first embodiment;

FIG. 11 is a schematic time chart showing an initial operation from turning on a power supply of an electronic camera according to a second embodiment;

FIG. 14 is a view showing a part of a structure of an imaging circuit;

FIGS. 25A and 25B are timing charts showing an operation of an electronic camera according to a sixth embodiment of the present invention;

FIGS. 27A and 27B are timing charts showing an operation of an electronic camera according to an eighth embodiment of the present invention.

DETAILED DESCRIPTION OF THE INVENTION

Figure 2:
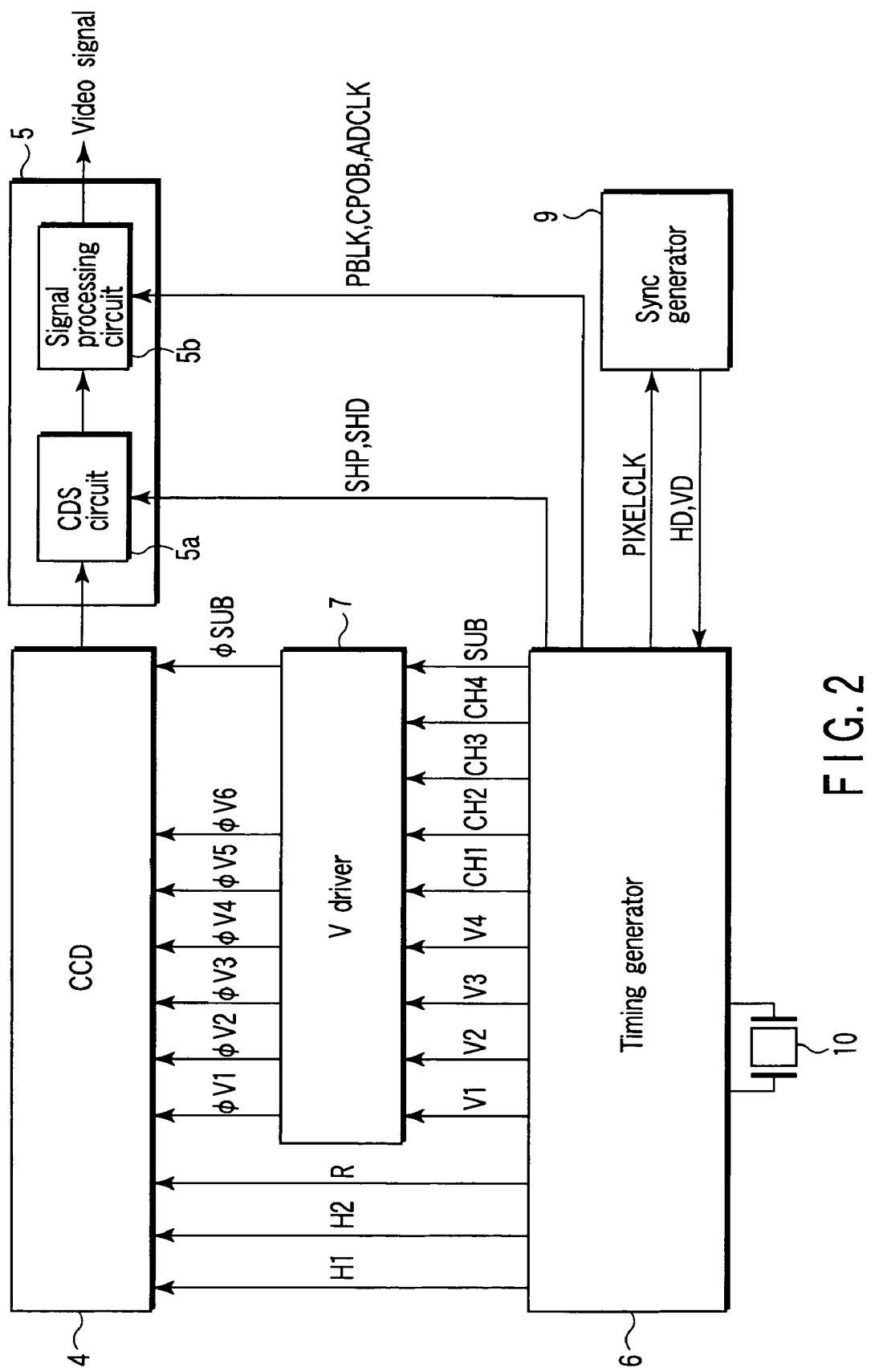
FIG. 2 is a view showing a structure of a signal between peripheral circuits of an imaging element.

A first embodiment according to the present invention will now be described.

FIG. 1 is a block diagram showing a structure of an electronic camera according to the first embodiment of the present invention.

This electronic camera includes a main CPU 1, a lens 2, an aperture mechanism 3, an imaging element 4, an imaging circuit 5, a timing generator 6, a V driver 7 and a power supply portion 8.

The main CPU 1 entirely controls each portion of the electronic camera. The aperture mechanism 3 controls exposure. The imaging element 4 converts an object field light into an electric signal. The imaging circuit 5 converts a signal of the imaging element 4 into a video signal. The timing generator 6 generates a timing signal for driving the imaging element 4. The V driver 7 controls a vertical transfer operation of the imaging element 4. The power supply portion 8 supplies a power supply voltage to each portion.

In this electronic camera, the main CPU 1 entirely performs all the controls, and it is in charge of a series of processing concerning a reading control for a signal of the imaging element 4, image processing and an exposure control.

The timing generator 6 is a general purpose type timing generator including an internal register in which a program can be set. This program setting is executed by serial setting from the main CPU 1.

A plurality of power supplies are provided in the power supply portion 8. A power supply +3.3V is supplied to the imaging circuit 5 and the timing generator 6. Power supplies +15V and −7.5V are supplied to the imaging element 4 and the V driver 7.

FIG. 2 is a view showing a structure of signals between peripheral circuits of the imaging element. FIG. 2 shows a sync generator 9 and an oscillator 10 which are not illustrated in FIG. 1. The imaging circuit 5 includes a CDS (correlative double sampling) circuit 5a used to ease noises and a signal processing circuit 5b which performs brightness signal correction and others.

The sync generator 9 receives a divided frequency clock signal PIXELCLK from the timing generator 6, and outputs a horizontal synchronization signal HD and a vertical synchronization signal VD to the timing generator 6.

The timing generator 6 outputs vertical clock signals V1 to V4, read pulses CH1 to CH4 and an electric charge discharge signal SUB for an electronic shutter to the V driver 7 with timings preset based on the horizontal synchronization signal HD and the vertical synchronization signal VD. The V driver 7 generates vertical shift pulse signals φV1 to φV6 and a φ SUB signal based on these signals, and controls an exposure operation and a vertical transfer operation of the imaging element 4.

Further, the timing generator 6 outputs horizontal shift pulses H1 and H2 and a reset pulse R with timings preset based on the horizontal synchronization signal HD and the vertical synchronization signal VD, and controls a horizontal transfer operation of the imaging element 4.

Furthermore, the timing generator 6 outputs sample-hold signals DS1 and DS2 to the CDS circuit 5a in order to control the correlative double sampling operation, and outputs clamp signals PBLK and CPOB and an AD conversion clock signal ADCLK to the signal processing circuit 5b.

Figure 3:
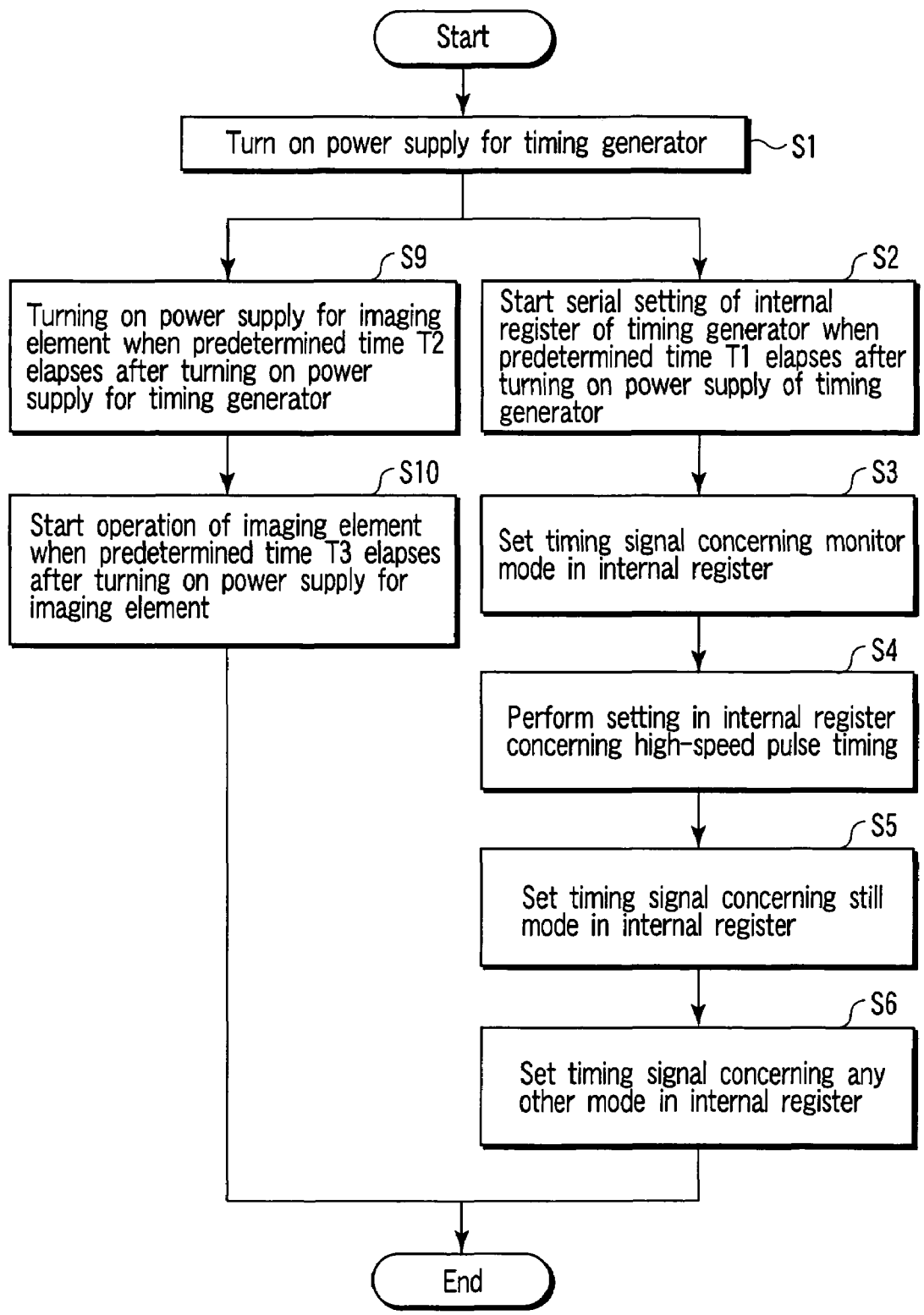
FIG. 3 is a schematic flow diagram showing an initial operation from turning on a power supply of the electronic camera according to the first embodiment.

FIG. 3 is a schematic flow diagram showing an initial operation from turning on the power supply of the electronic camera according to the first embodiment. FIG. 4 is a schematic time chart showing an initial operation from turning on the power supply of the electronic camera according to the first embodiment. An operation of this electronic camera will now be described hereinafter with reference to FIGS. 3 and 4.

At a step S1, when a camera operator turns on a power switch of the electronic camera, the main CPU 1 starts an operation to control the power supply portion 8, and supplies a power supply +3.3V to the timing generator 6.

At a step S2, the main CPU 1 starts serial setting with respect to the internal register of the timing generator 6 after an elapse of a predetermined time T1 that the timing generator 6 is stabilized.

At a step S3, the main CPU 1 performs setting of the internal register with respect to a timing signal concerning a monitor mode. The monitor mode is a mode in which a moving picture of an object is displayed in a monitor and it is a mode in which the electronic camera first starts an operation.

Figure 5:
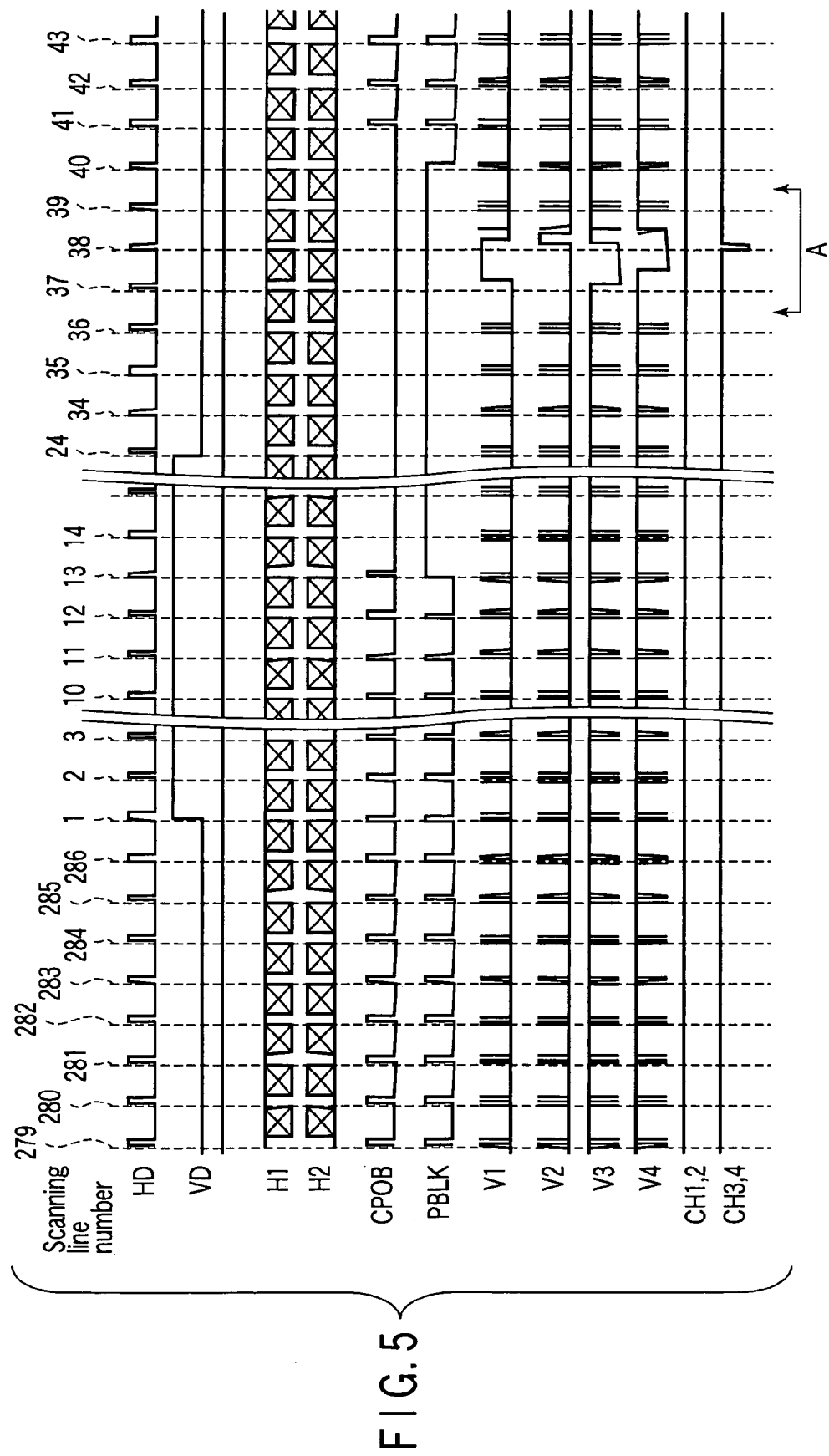
FIG. 5 is a time chart showing a vertical transfer drive timing in a monitor mode.

FIG. 5 is a time chart showing a vertical transfer drive timing in the monitor mode.

The main CPU 1 carries out serial setting in such a manner that the timing generator 6 outputs a timing signal with timing illustrated in FIG. 5. As shown in FIG. 5, the timing signal is not always regular. For example, at scanning line numbers 37 to 39 (part A), V1 to V4, CH3 and CH4 execute an operation to read electric charges to a vertical transfer path in the monitor mode.

Figure 6:
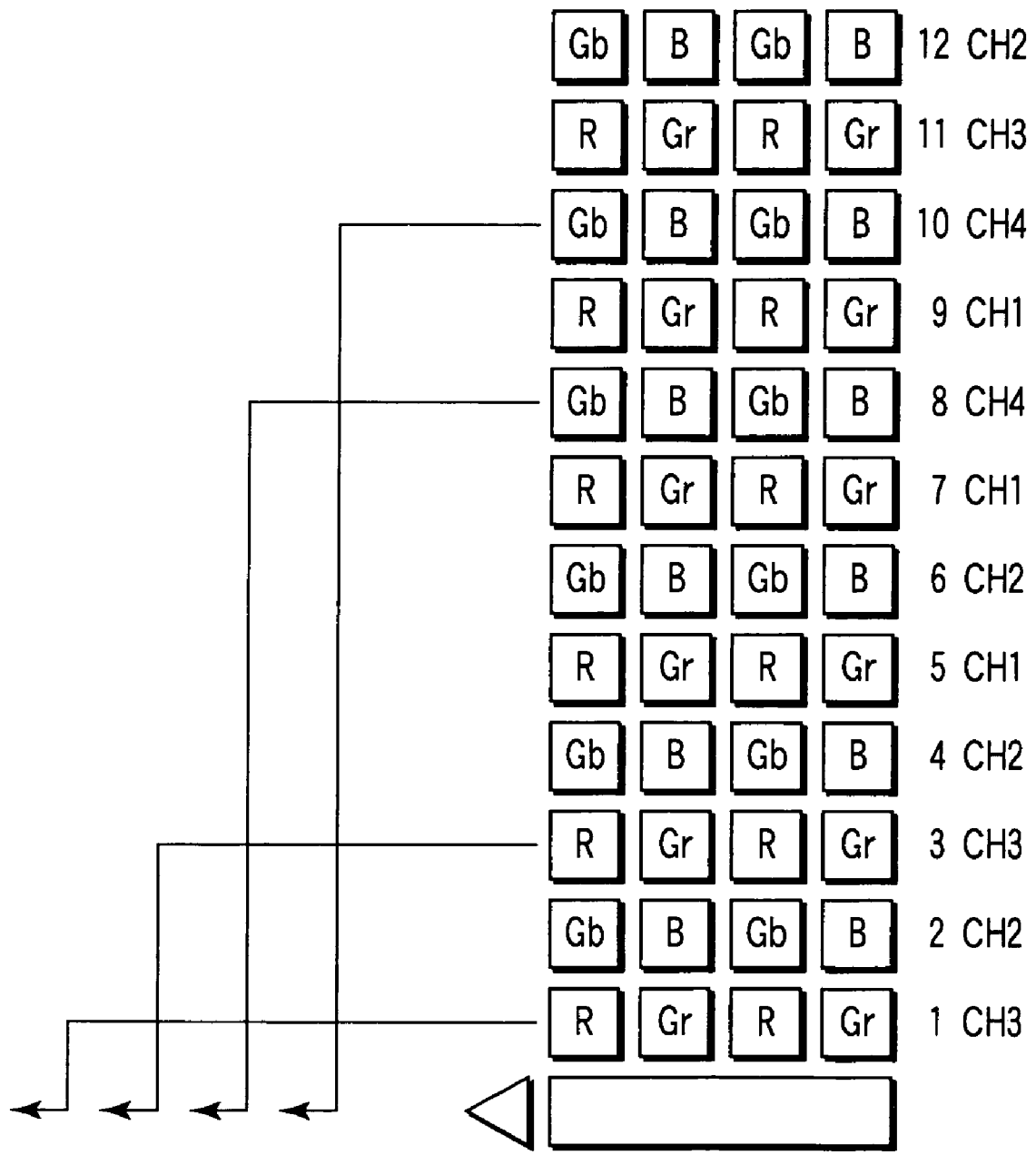
FIG. 6 is a view illustrating a vertical read operation in the monitor mode.

FIG. 6 is a view illustrating the vertical read operation in the monitor mode.

In the monitor mode, all lines are not read but thinned-out reading is performed in order to realize 30 frames/second. For the purpose of further increasing the sensitivity, reading with two pixels being added is carried out. Therefore, only the read pulses CH3 and CH4 are operated (without operating CH1 and CH2), four lines 1, 3, 8 and 10 are read, the lines 1 and 3 and the lines 8 and 10 are added, and they are read as two lines.

Figure 7:
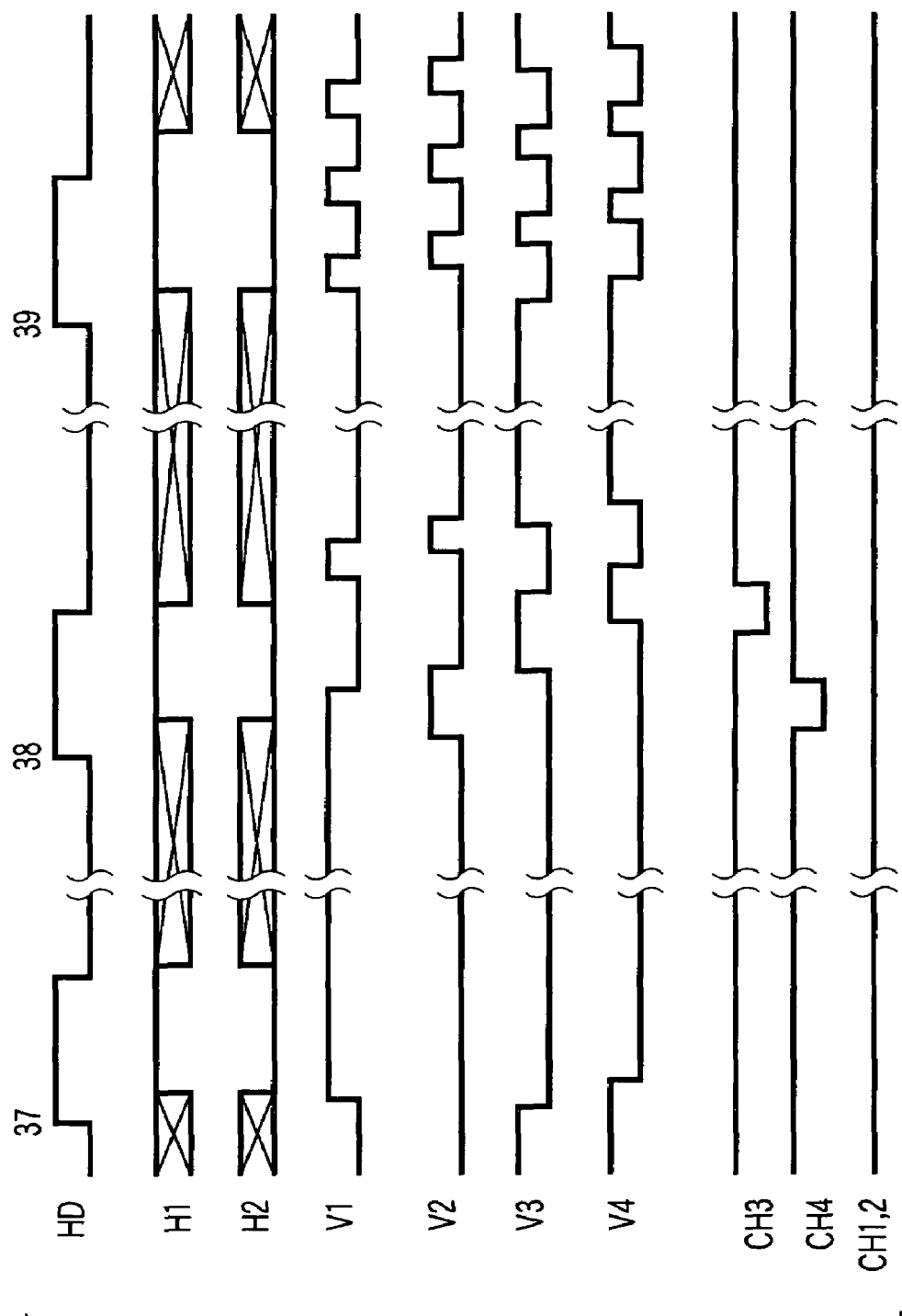
FIG. 7 is a view showing a part of the time chart in the monitor mode in the enlarged manner.

FIG. 7 is a view showing an enlarged part A in the time chart of FIG. 5.

The respective signals V1 to V4, CH3 and CH4 are set by the main CPU 1 so that the timing depicted in FIG. 7 can be realized. It is to be noted that V1 to V4 output the pulse signals for three times in one scanning line in order to perform three-stage transfer involved by the thinned-out reading at the scanning line number 39 and the subsequent scanning line numbers.

At a step S4, the main CPU 1 performs setting of the internal register in relation to high-speed pulse timings of a horizontal transfer operation of the imaging element 4, a sample-hold operation of the CDS circuit 5a, a clamp operation of the signal processing circuit 5b and others.

Figure 8:
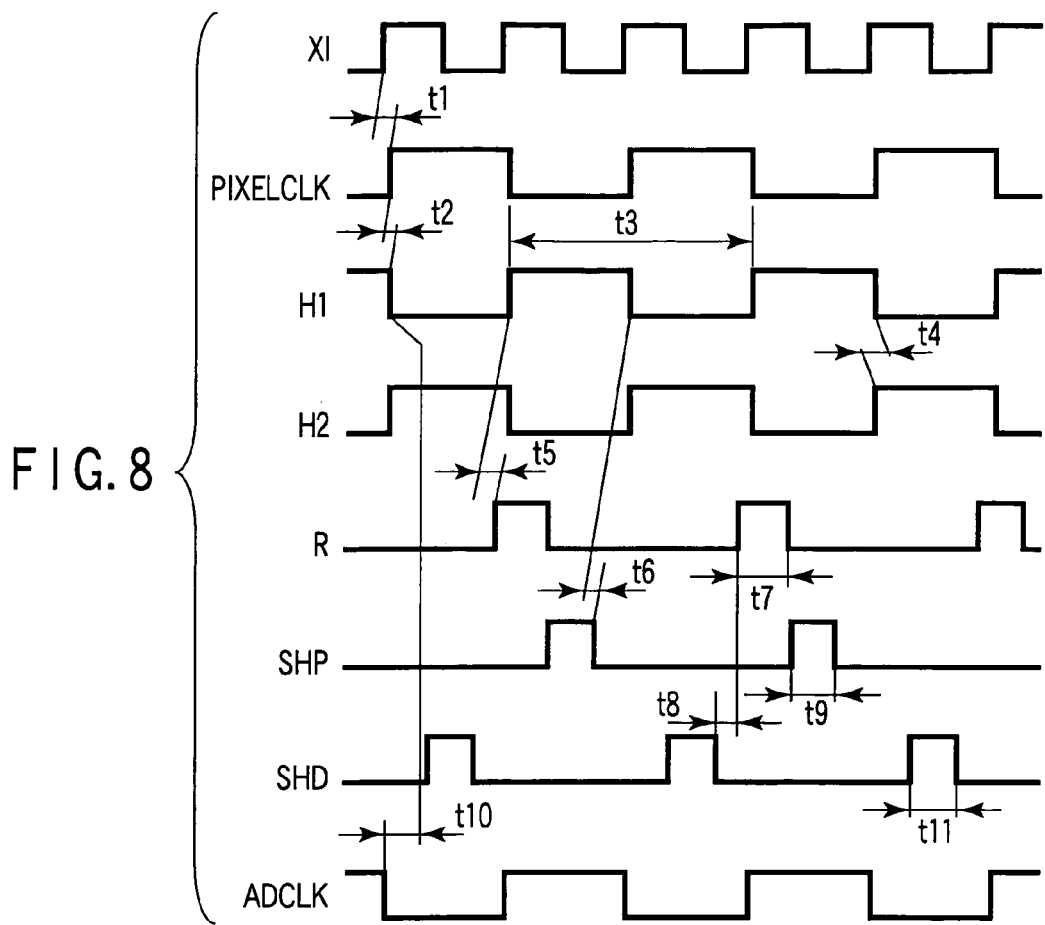
FIG. 8 is a flowchart showing a high-speed pulse timing.

FIG. 8 is a time chart showing the high-speed pulse timings.

The main CPU 1 performs serial setting in the internal register of the timing generator 6 in such a manner that each signal including a clock signal XI from the oscillator 10 operates with each timing shown in FIG. 8.

At a step S5, the main CPU 1 performs setting of the internal register with respect to a timing signal concerning a still mode. The still mode is a mode which is operated by a shutter operation of the electronic camera and stores a taken image of an object.

Figure 9B:
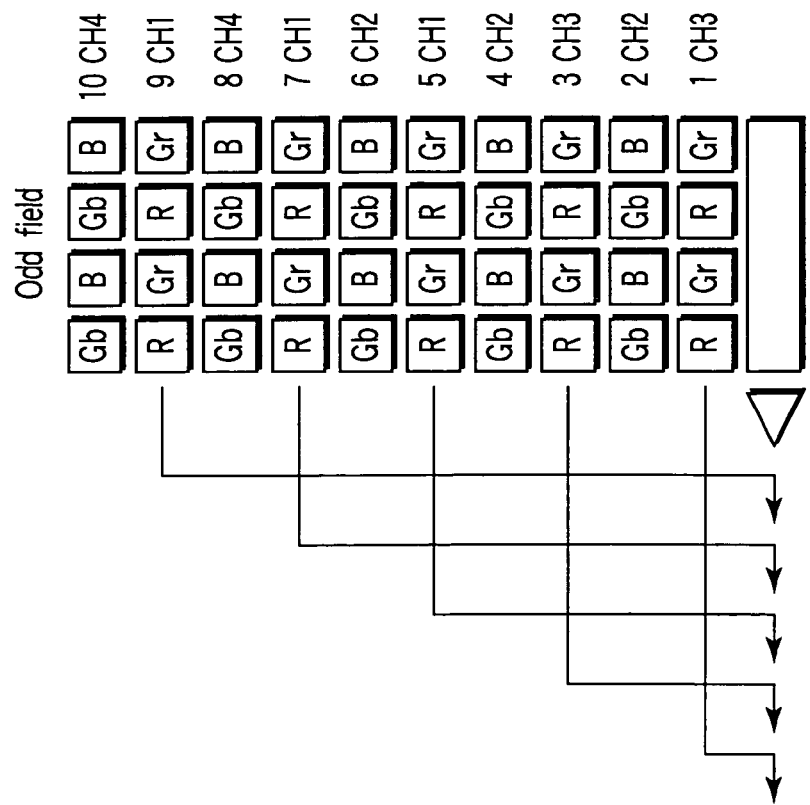
FIGS. 9A and 9B are views illustrating a vertical read operation in a still mode.
Figure 9A:
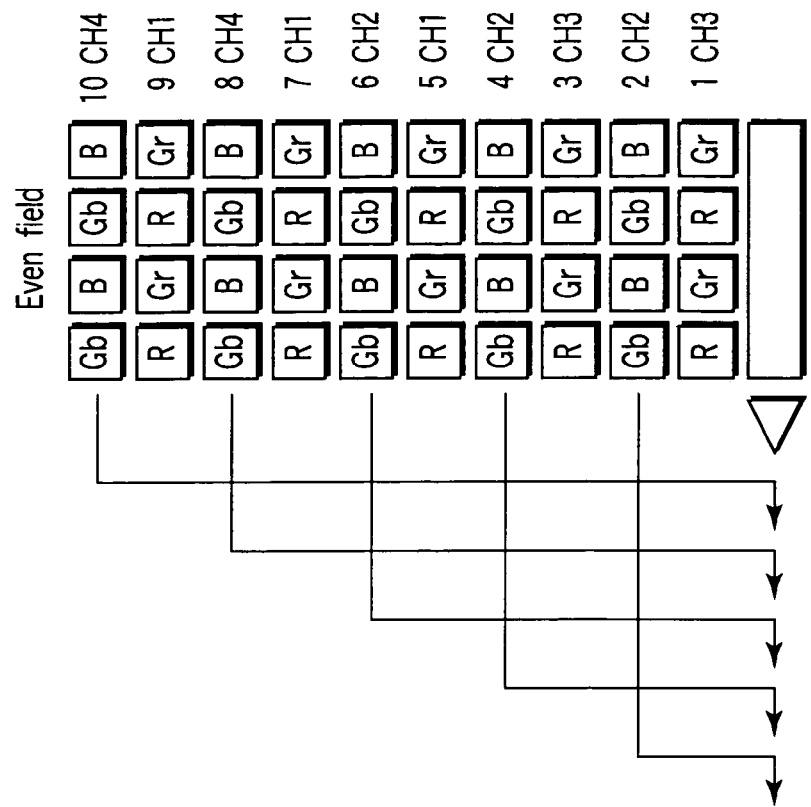

FIGS. 9A and 9B are views illustrating a vertical read operation in the still mode.

In the still mode, a 2:1 interlace reading is carried out. That is, the odd-numbered lines are first read and processed, and then even-numbered lines are read and processed. Therefore, as shown in FIG. 9A, in reading of the odd-numbered lines, only the read pulses CH1 and CH3 are operated. In reading of the even-numbered lines, as shown in FIG. 9B, only the read pulses CH2 and CH4 are operated.

Figure 10:
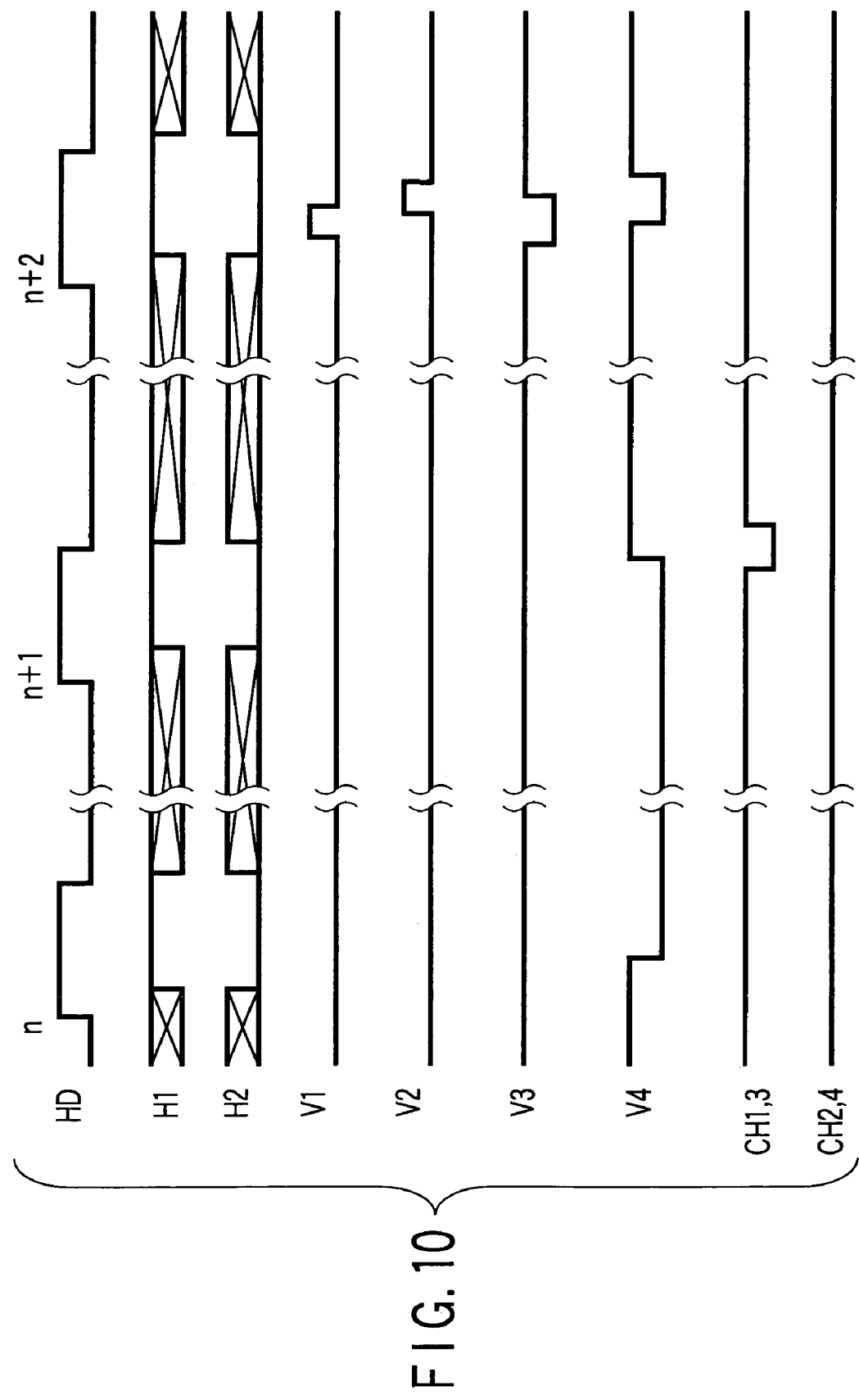
FIG. 10 is a view showing a part of the time chart in the still mode in the enlarged manner.

FIG. 10 is a view showing a part of the time chart in the still mode in the enlarged manner.

FIG. 10 shows a read timing for the odd-numbered line. The main CPU 1 sets the respective signals V1 to V4, CH1 and CH3 so as to realize the timings depicted in FIG. 10. Incidentally, at the scanning line number n+1 and the subsequent scanning line numbers, V1 to V4 output one pulse signal in one scanning line in order to conduct one-stage transfer. The read timing for the even-numbered line is the same as that for the odd-numbered line, thereby eliminating its detail.

At a step S6, the main CPU 1 sets in the internal register timing signals concerning any other modes, e.g., an electronic zoom mode, a rapid sequence mode or the like.

At a step S9, the main CPU 1 supplies power supplies +15V and −7.5V to the imaging element 4 when a predetermined time T2 elapses after turning on the power supply of the timing generator 6 simultaneously with the setting with respect to the timing generator 6. At a step S10, when a predetermined time T3 elapses after the power supply of the imaging element 4 is turned on, the operation of the imaging element 4 is started.

Conventionally, the CPU 1 waits for the timing generator 6 and the imaging element 4 to start up and then performs the serial setting in the internal register. In the first embodiment, the serial setting is carried out in the internal register when the timing generator 6 starts. As a result, a delay is not generated in the operation of the electronic camera, and the operability is not lowered.

Further, in the serial setting of the internal register, the setting of the monitor mode is performed by priority. That is, the setting concerning the monitor mode is terminated before a time required for the imaging element 4 to perform the stable operation elapses. Therefore, even if all the settings are not completed in the internal register before the imaging element 4 starts the operation, at least the setting concerning the monitor mode is terminated. Thus, even if all the settings are not completed in the internal register before the imaging element 4 starts the operation, since the operation in the monitor mode which is the mode in which the electronic camera first operates can be started, a delay is not generated in the operation of the electronic camera, and hence the operability is not deteriorated.

It is to be noted that the setting operation relative to the internal register and the starting operation of the imaging element may be prevented from being independently carried out, and they may be performed in association with each other. For example, the operation of the imaging element may be started when the both conditions, i.e., completion of the setting operation relative to the internal register and an elapse of the time required for the imaging element 4 to perform the stable operation are satisfied.

A second embodiment according to the present invention will now be described.

FIG. 11 is a schematic time chart showing an initial operation after turning on a power supply of an electronic camera according to the second embodiment. In the second embodiment, a difference from the first embodiment is that a set value verifying operation is performed, by which the set value is read from the internal register of the timing generator 6 immediately after the main CPU 1 performs the program setting in the internal register of the timing generator 6, and the set value is verified.

In case of using the conventional timing generator constituted of a dedicated hardware logic, data is again set with a predetermined cycle or the like even after the data is set when starting up the imaging portion. In the general purpose timing generator, however, an amount of data to be set as described above is large. Therefore, repeatedly setting data with a predetermined cycle or the like as in the prior art prevents the smooth operation of the electronic camera, which is not preferable.

Thus, in this embodiment, the setting is performed at the time of starting-up of the imaging portion, and the setting of all the registers is not thereafter carried out when it is confirmed that the set value is correct.

It is to be noted that the present invention is not restricted to the conformation that the set value is read from the internal register and verified after the setting operation relative to all the internal registers is completed. The present invention may be constituted by appropriately combining the setting operation and the verifying operation.

According to the second embodiment, even if noises are apt to be mixed in, e.g., starting-up of the imaging portion, it is possible to guarantee that the serial setting is correctly performed. As a result, the subsequent repeated setting of data is no longer necessary, the smooth operation can be assured even if the general timing generator is used like the prior art.

A third embodiment according to the present invention will now be described.

The third embodiment solves a problem that an image signal level fluctuates when a substrate voltage Vsub is switched, a signal processing circuit on a rear stage, especially a clamp processing circuit thereby malfunctions, and noises are temporarily generated, which leads to occurrence of signal shading in an image.

Figure 12:
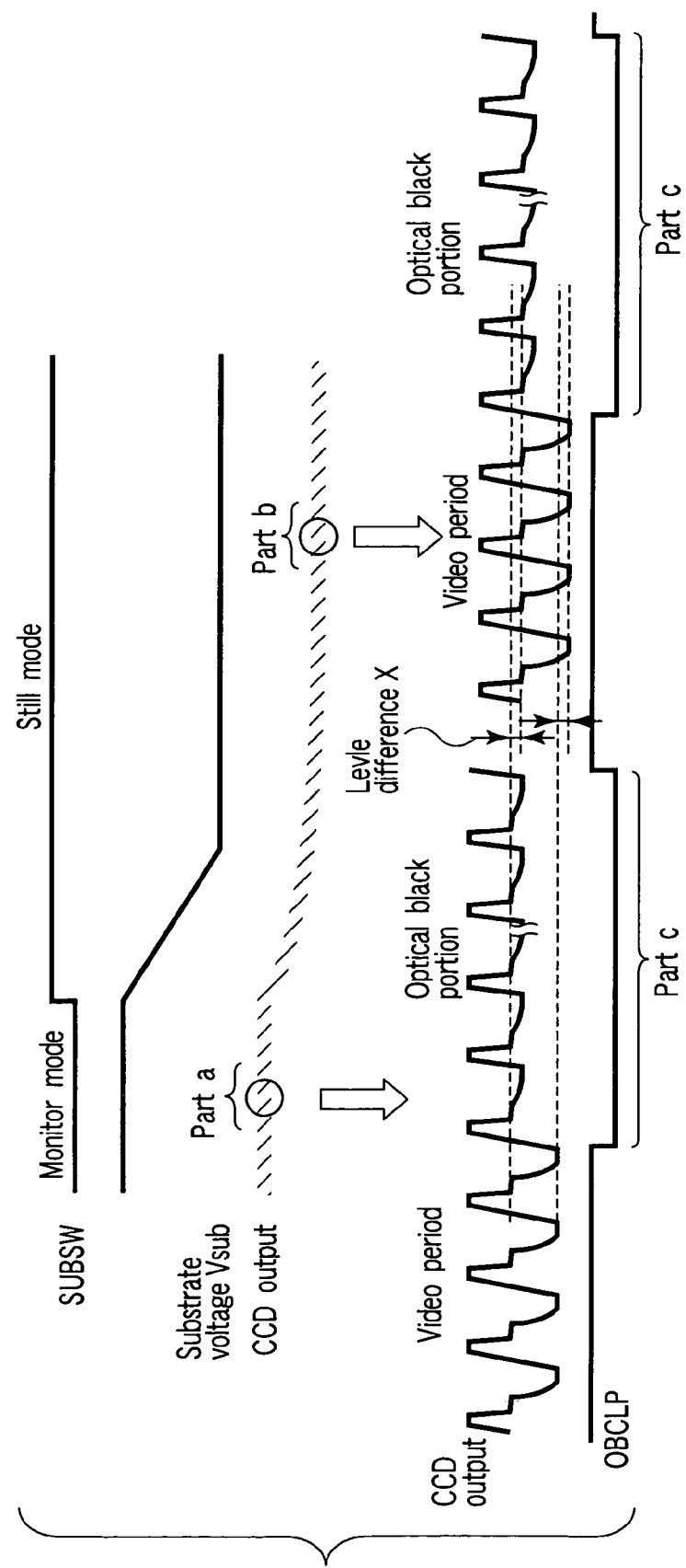
FIG. 12 is a view illustrating a cause of a clamp miss.

FIG. 12 is a view illustrating a factor of a malfunction of the clamp processing circuit.

When a signal SUBSW used to switch from a monitor mode which is a mode to display a moving image to a still mode which is a mode to display a still image is inputted, a substrate voltage Vsub is switched to a low voltage in order to increase handling electric charges. At this time, a slight level difference is generated in a bias level of a CCD output.

FIG. 12 shows a CCD output waveform (part a) in the monitor mode and a CCD output waveform (part b) in the still mode in the enlarged manner. A level difference x involved by switching of the substrate voltage Vsub is generated in the both waveforms.

Furthermore, although this enlarged CCD output waveforms (part a, part b) represent waveforms in video periods and optical black portions. Of these periods, in a period (part c) that an optical black clamp pulse OBCLP which is a sample pulse is outputted, a signal in the optical black portion is clamped as a black level reference signal.

However, since the clamp circuit has a long time constant, it cannot immediately follow a change in the level difference x, a clamp miss of the black level is thereby generated, and the signal shading is produced in an image.

Figure 13:
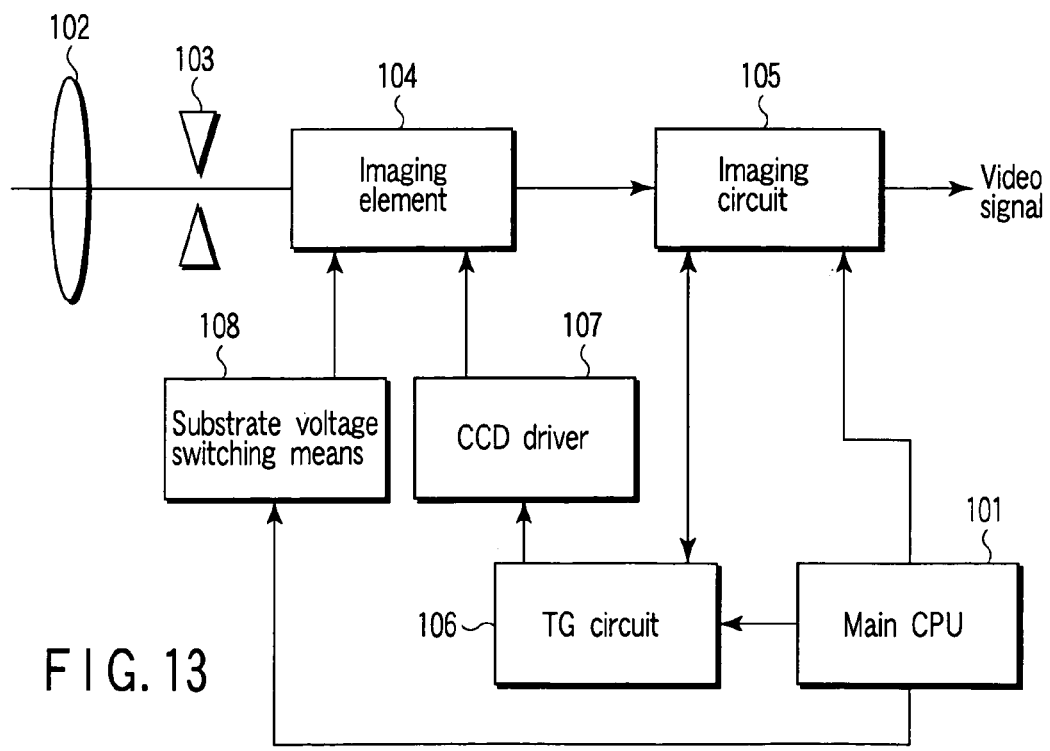
FIG. 13 is a block diagram showing a structure of an electronic camera according to a third embodiment of the present invention.

FIG. 13 is a block diagram showing a structure of the electronic camera according to the third embodiment of the present invention.

This electronic camera includes a main CPU 101, a lens 102, an aperture mechanism 103, an imaging element 104, an imaging circuit 105, a TG circuit 106, a CCD driver 107, and substrate voltage switching means 108.

The main CPU 101 entirely controls respective portions in this electronic camera. The aperture mechanism 103 controls exposure. The imaging element 104 converts an object field light into an electric signal. The imaging circuit 105 converts a signal from the imaging element 104 into a video signal. The TG circuit 106 generates a drive timing signal for the imaging element 104. The CCD driver 107 drives the imaging element 104. The substrate voltage switching means 108 switches the substrate voltage Vsub.

In this electronic camera, the main CPU 101 entirely controls all the portions, and it is in charge of a series of processing such as a reading control over a signal from the imaging element 104, image processing, an exposure control and others.

FIG. 14 is a view showing a part of a structure of the imaging circuit 105.

The imaging circuit 105 includes a CDS (correlative double sampling) circuit 12, an amplifier 113, an AD conversion circuit 114, and others. Referring to FIG. 14, a clamp operation of the black level will now be described.

After a direct-current component is removed from an output signal of the CCD through a coupling capacitor 111, noises are reduced in the CDS (correlative double sampling) circuit 112. Furthermore, after signal amplification is performed in the amplifier 113, the signal is converted into a digital signal in the AD conversion circuit 114, and it is subjected to signal processing on a next stage. Here, an amplification factor of the amplifier 113 directed from the main CPU 101 is informed to a gain setting circuit 115, and it is set in the amplifier 113.

Of the waveforms of the output signal from the CCD (CCD output waveforms), the CDS circuit 112 takes a difference in CCD output level between a period that the electric charges are reset (field through period) and a period that the signal is outputted (signal period), thereby reducing noises.

Thus, a field through level storage circuit 116 stores a signal level in the field through period by using a sample-hold pulse SHP outputted in the field through period. The CDS circuit 112 acquires a signal level in the signal period by using a sample-hold pulse SHD outputted in the signal period, and calculates a level difference.

Of the CCD output waveforms, the signal in the above-described optical black portion is fed back to the CDS circuit 112 through a feedback amplifier 117 in a period that the optical black clamp pulse OBCLP is outputted, and processed as a reference signal of the black level.

Figure 15:
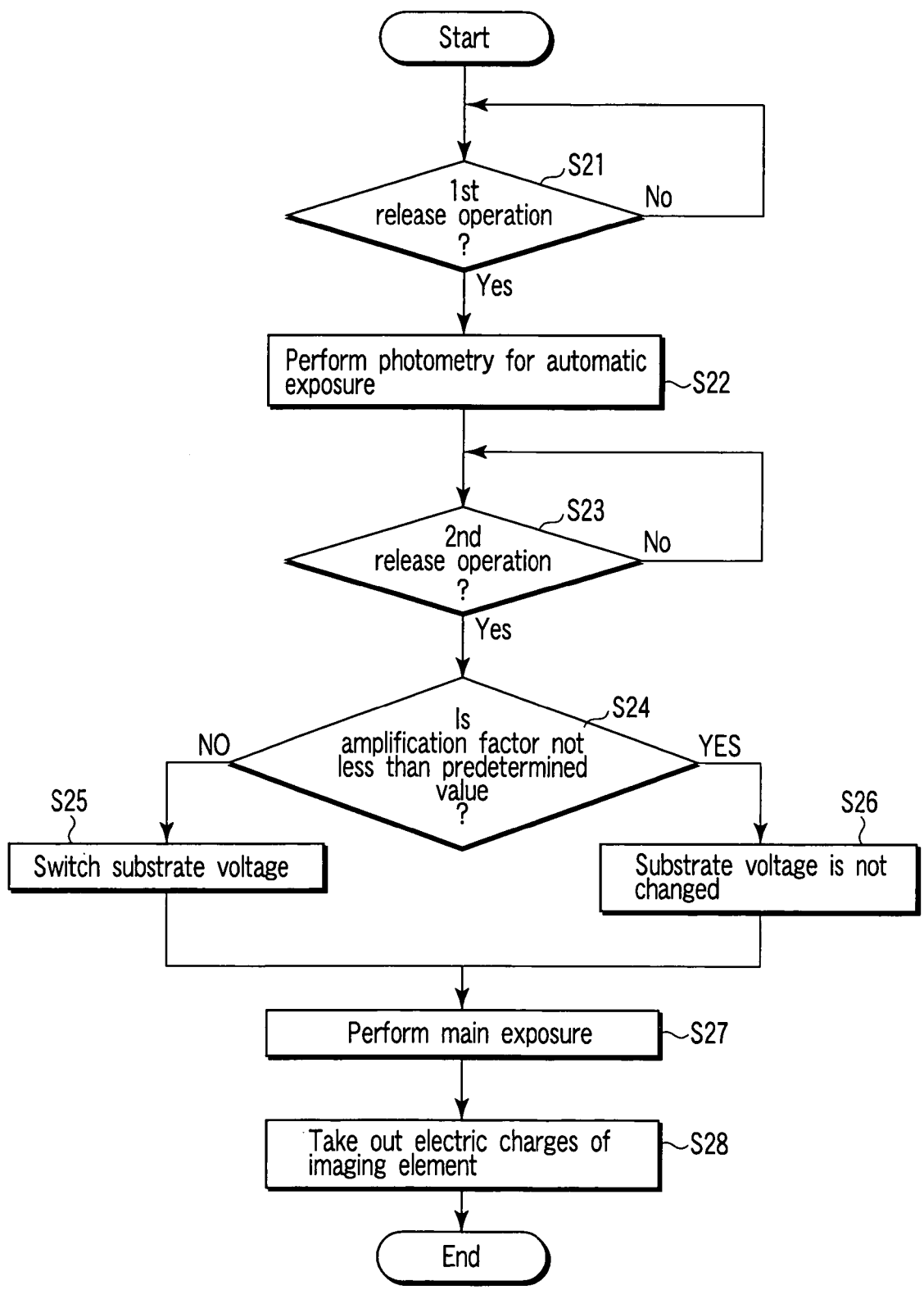
FIG. 15 is a flow diagram showing an operation of the electronic camera according to the third embodiment.

FIG. 15 is a flow diagram showing a schematic operation of the electronic camera according to the third embodiment.

Figure 16:
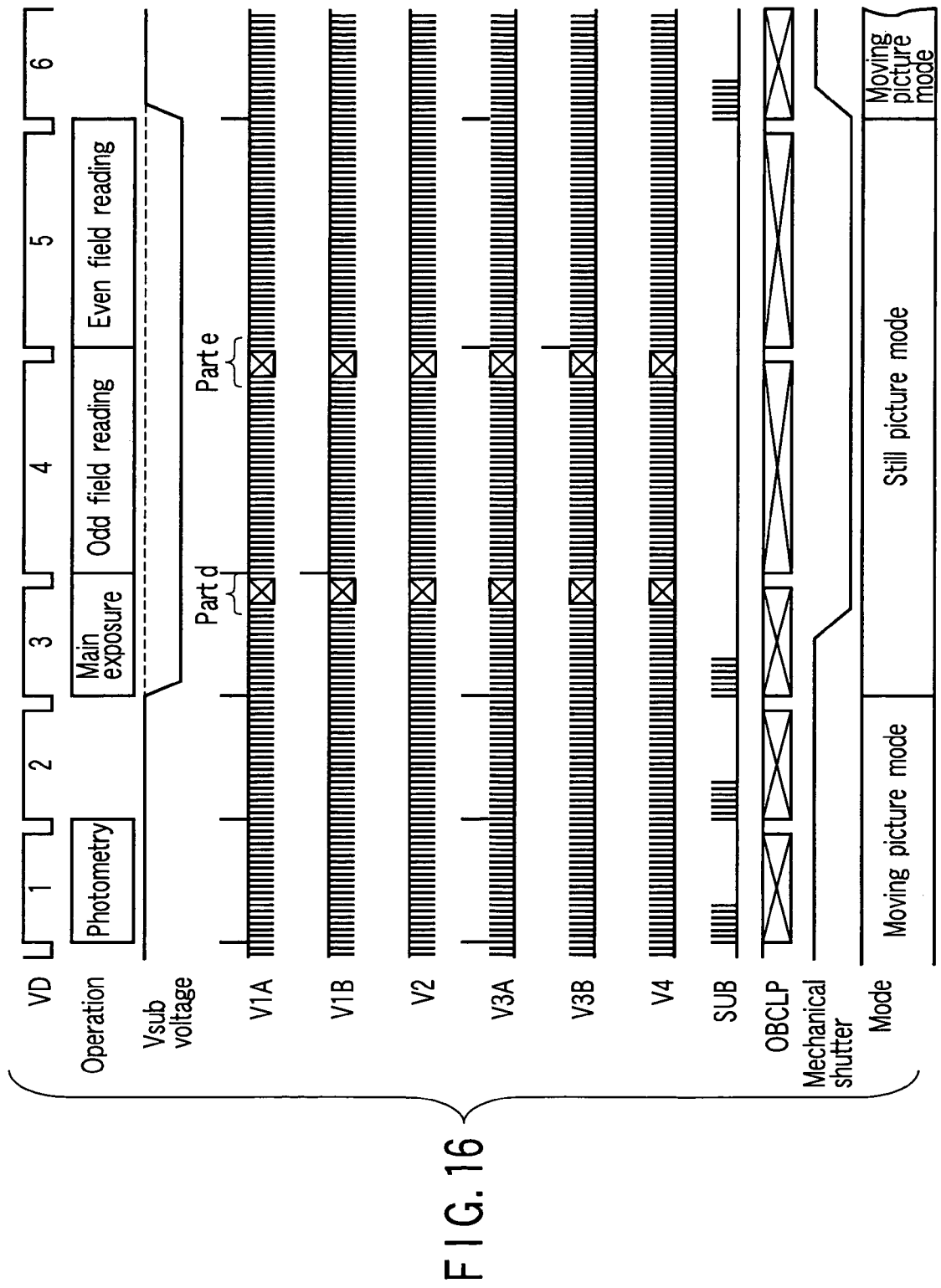
FIG. 16 is a timing chart showing an operating of the electronic camera according to the third embodiment.

FIG. 16 is a timing chart showing an operation of the electronic camera according to the third embodiment. An interval of a vertical synchronization signal VD is called a frame period, and numbers are given in FIG. 16 in order to specify the frame period.

Whether a camera operator has performed a release operation is always monitored. Further, if an answer is Yes at a step S21, namely, if the release button is pressed for one stage (1st release operation), the photometry is carried out in a first frame period for automatic exposure at a step S22. Then, shooting conditions such as an aperture, an exposure time and others are determined based on this photometric value.

Subsequently, whether the release button is pressed for two stages (2nd release operation) is monitored. Then, if an answer is Yes at a step S23, i.e., if the 2nd release operation is carried out, a judgment is made upon whether the substrate voltage Vsub is switched in a second frame period at a step S24. That is, a judgment is made upon whether the substrate voltage Vsub is switched based on whether an amplification factor of the amplifier 113 is not less than a predetermined value.

If an answer is No at a step S24, i.e., if the amplification factor of the amplifier 113 is less than a predetermined value, the substrate voltage Vsub is switched to a low voltage in a third frame period at a step S25, thereby increasing a handling electric charge quantity. If an answer is Yes at a step S24, i.e., if the amplification factor of the amplifier 113 is not less than a predetermined value, the substrate voltage Vsub is not switched in the third frame period and the high voltage is maintained at a step S26.

At the step S26, the main exposure is carried out in the third frame period. In this third frame period, the shooting mode is switched from the moving picture mode to the still picture mode, and the mechanical shutter is closed.

Figure 17:
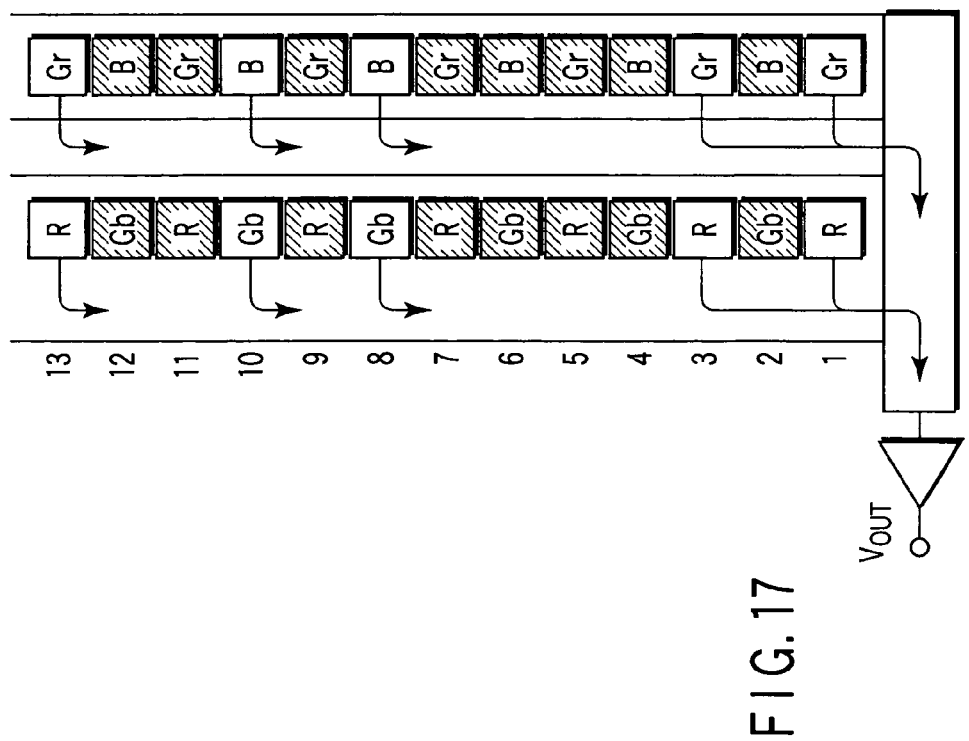
FIG. 17 is a view illustrating an operation of a two-pixel addition monitor mode.

In the moving picture mode, the electric charges of the imaging element 104 are read in a two-pixel addition monitor mode. The first, second and sixth frame periods in FIG. 16 correspond to this. FIG. 17 is a view illustrating an operation in a two-pixel addition monitor mode. This two-pixel addition monitor mode is a mode that electric charges of a first horizontal column, a third horizontal column, an eighth horizontal column, a 10th horizontal column, . . . are selectively taken out, e.g., they are thinned out and taken out, and they are added in a vertical transfer path and read.

Since reading the electric charges in this manner can reduce a reading time, a frame rate which can cope with the regular moving picture display can be realized although the picture quality is poor.

Incidentally, as described in connection with the two-pixel addition monitor mode, a system that signal electric charges stored in two photosensitive elements are added and transferred is referred to as a field storage system.

Since the third frame period is a period immediately after switching the mode, it is determined that the read signal is in an unstable state and this signal is not used. Furthermore, at a part d in the third frame period, high-speed flushing to flush unnecessary electric charges caused due to an influence of a dark current produced in the vertical transfer path is performed before taking out the signal electric charges obtained by the main exposure to the transfer path.

At a step S8, in the next fourth and fifth frame periods, the signal electric charges based on the main exposure are read in the frame read mode in order to obtain a still picture with the good image quality.

Figure 18B:
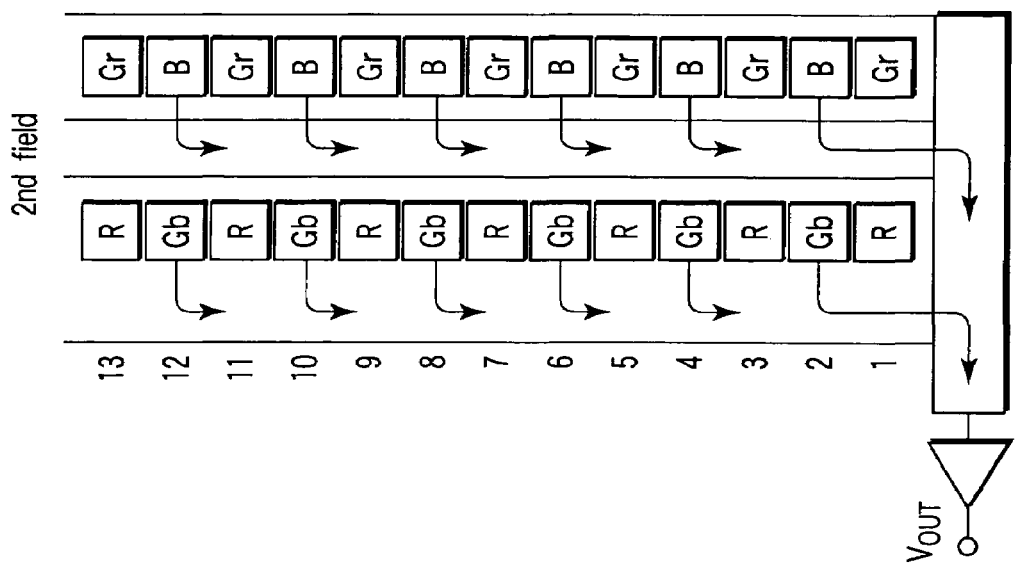
FIGS. 18A and 18B are views illustrating an operation in a frame read mode.
Figure 18A:
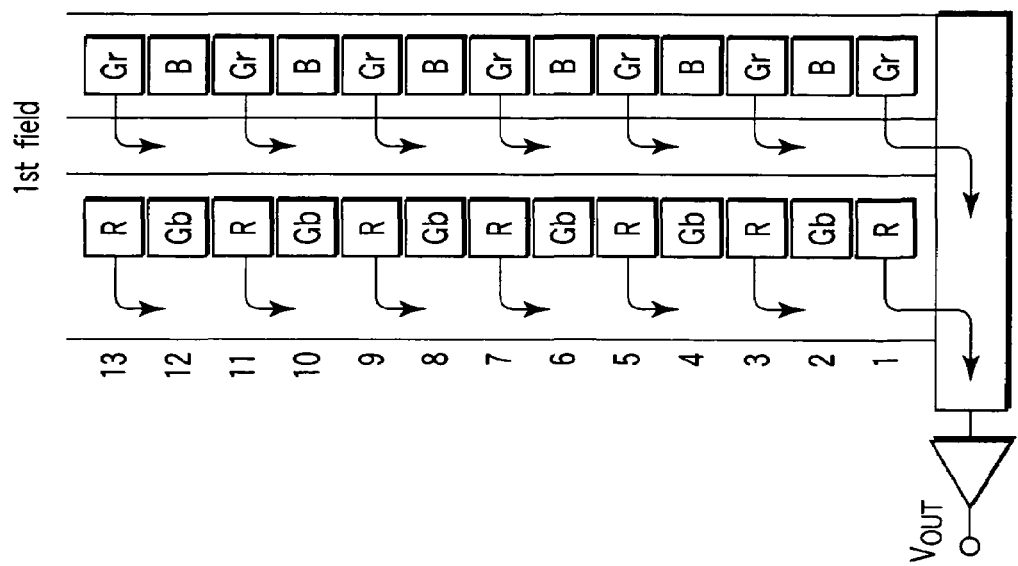

FIGS. 18A and 18B are views illustrating operations in the frame read mode. This frame read mode is a mode which performs interlace reading that signal electric charges of the first, third, fifth, . . . horizontal columns are sequentially read in the first field period and signal electric charges of the second, fourth, sixth, . . . horizontal columns are sequentially read in the second field period. It is to be noted that the first field may be referred to as an Odd field and the second field may be referred to as an Even field in some cases.

It is to be noted that a system that signal electric charges stored in one photosensitive element are transferred as a unit without performing addition is called a frame storage system.

Thus, in the fourth frame period in FIG. 16, high-voltage pulses are applied to vertical drive signals V1A and V1B, and electric charges in the Odd field are read, thereby performing the transfer operation. Then, after effecting the high-speed flushing at a part e in the fourth frame period, high-voltage pulses are applied to vertical drive signals V3A and V3B and electric charges in the Even field are read in the fifth frame period, thereby effecting the transfer operation.

After reading the signal electric charges of the main exposure by the above-described operation, the shooting mode is switched from the still picture mode to the moving picture mode and the substrate voltage Vsub is switched to a high voltage in the sixth frame period.

In the third embodiment, when the amplification factor of the amplifier 113 is smaller than a predetermined value, the substrate voltage Vsub is switched to a low voltage in order to increase the handling electric charge quantity. However, when the amplification factor of the amplifier 113 is not less than the predetermined value, the high voltage is maintained without switching the substrate voltage Vsub.

As described above, when the substrate voltage Vsub is switched, the clamp processing circuit erroneously operates, the signal shading is generated in an image, and this phenomenon becomes prominent as an amplification factor at an output stage of the imaging element is increased.

Therefore, when the amplification factor of the amplifying means which amplifies an output signal from the imaging element is not less than a predetermined value, the prominent distortion of an image can be prevented by inhibiting switching of the substrate voltage Vsub. It is to be noted that a reduction in image involved by disabled switching of the substrate voltage Vsub can be considered, but the distortion of the image involved by switching of the substrate voltage Vsub lowers the image quality more than a reduction in handling electric charges, thereby improving the image quality as compared with the prior art.

On the other hand, when the amplification factor of the amplifying means which amplifies an output signal from the imaging element is not more than a predetermined value, the distortion of an image is not a concern even if the substrate voltage Vsub is switched.

As described above, according to the third embodiment, noises superimposed on an image signal can be reduced while effectively increasing the handling electric charges. It is to be noted that a predetermined value of the amplification factor can be appropriately determined based on a fluctuation status of an image. If a minimum value of the amplification factor is determined for each shooting condition, that value may be adopted as a predetermined value.

Moreover, in the third embodiment, the substrate voltage Vsub is controlled in such a manner that the handling electric charges of the imaging element are further reduced when an image signal is displayed in the moving picture mode as compared with a case that an image signal is displayed in the still picture mode.

When performing the regular moving picture display, the mechanical shutter is opened and the imaging element is always irradiated with the light, blooming is apt to occur. Therefore, reducing the handling electric charges of the imaging element can suppress the influence of blooming.

Here, "when an image signal is displayed in the moving picture mode" means a period that the shooting mode is the moving picture mode. "When an image signal is displayed in the still picture mode" means a period that the shooting mode is the still picture mode. In this embodiment, therefore, "when an image signal is displayed in the moving picture mode" means the first, second and sixth frame periods shown in FIG. 16. "When an image signal is displayed in the still picture mode" means the third, fourth and fifth frame periods depicted in FIG. 16.

Moreover, in the third embodiment, in the field storage period, the substrate voltage Vsub is controlled in such a manner that the handling electric charges are further reduced as compared the frame storage period.

Here, the "field storage period" means a frame period in which electric charges are read based on the field storage system that the signal electric charges stored in two photosensitive elements are added and transferred. The "frame storage period" means a frame period in which electric charges are read based on the frame storage system that the signal electric charges stored in one photosensitive element are transferred as a unit without performing addition.

Since a plurality of pixels in adjacent columns are simultaneously read in the field storage period, the possibility of overflow of electric charges in a transfer line is large as compared with the frame storage period in which pixels are read in accordance with each column. Thus, the overflow of the electric charges in the transfer line can be reduced by controlling the substrate voltage Vsub in such a manner that the handling electric charge quantity in the field storage period is smaller than that in the frame storage period.

Fourth to ninth embodiments mentioned below solve a problem that unnecessary electric charges remain when high-speed flushing is carried out in an n:1 (n is a natural number not less than 3) interlace read type imaging element and a problem that a clamp miss of the black level is generated by switching of the substrate voltage Vsub and the signal shading is produced in an image.

First, a description will be given as to a factor that performing the high-speed flushing causes unnecessary electric charges to remain in the n:1 (n is a natural number not less than 3) interlace read type imaging element.

Figure 19C:
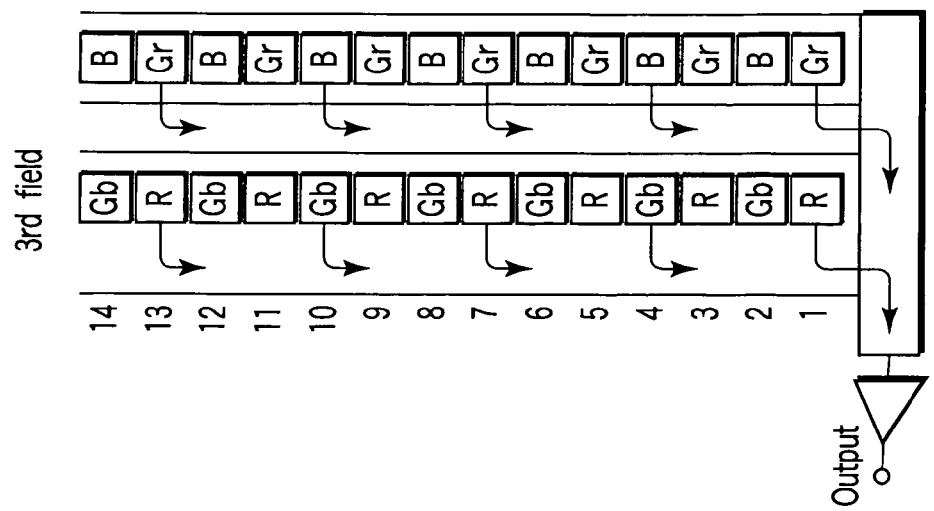
FIGS. 19A, 19B and 19C are views showing a field read method of the imaging element.
Figure 19B:
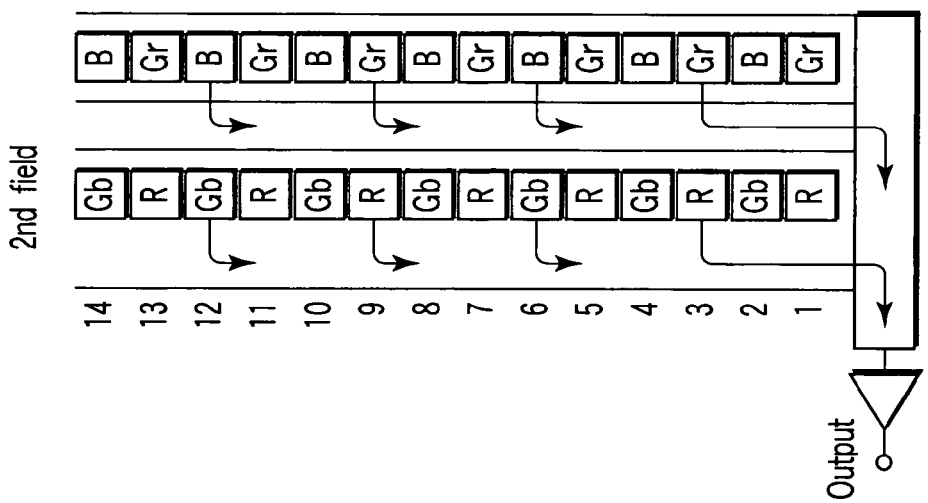
Figure 19A:
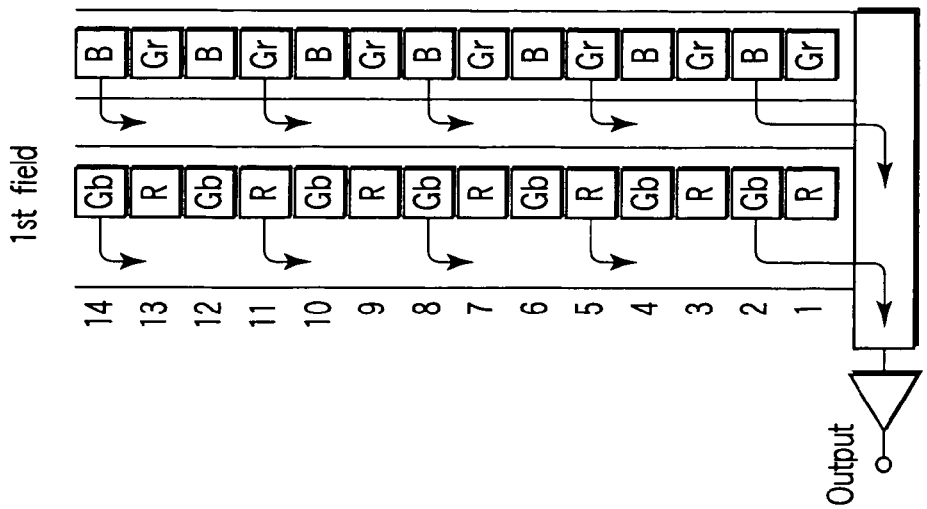

FIGS. 19A, 19B and 19C are views showing a field read method of a 3:1 interlace read type imaging element. In a conventional 2:1 interlace read type imaging element, electric charges in an odd-numbered field and an even-numbered field are read, thereby constituting one frame (which will be referred to as a "two-field read type" hereinafter). However, in the 3:1 interlace read type imaging element, as shown in FIGS. 9A to 9C, electric charges are read every three fields, thereby constituting one frame (which will be referred to as a "three-field read type" hereinafter).

Figures 20A, 20B:
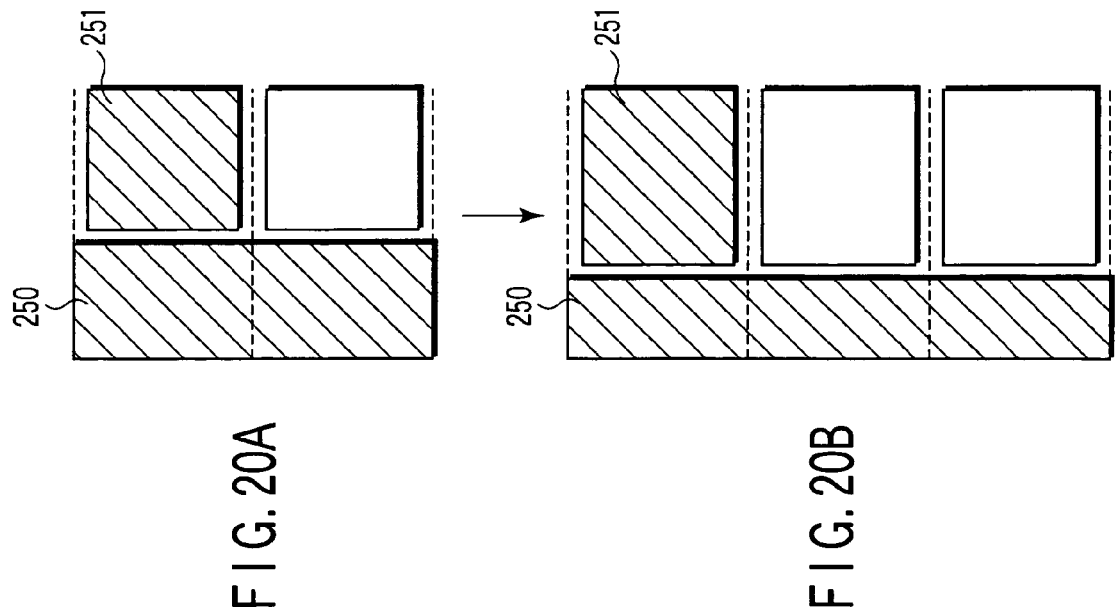
FIGS. 20A and 20B are views showing an element structure of a three-field read method in comparison with an element structure of a two-field read method.

FIGS. 20A and 20B show a comparison between the three-field read type element structure and the two-field read type element structure. FIG. 20A is a view showing the two-field read type element structure, and FIG. 20B is a view showing the three-field read type element structure.

In the three-field read type imaging element, since electric charges per pixel can be transferred by using a three-stage vertical transfer portion 250, an area of the vertical transfer portion 250 per stage can be reduced. As a result, a light receiving area of a photodiode portion 251 can be increased, thereby improving the light receiving sensitivity of the imaging element.

However, reducing an area of the vertical transfer portion 250 per stage deteriorates an electric charge transfer efficiency at the time of high-speed flushing. As a result, unnecessary electric charges remain in the vertical transfer portion 250, and white noises like vertical lines are produced.

It is to be noted that the factor by which the clamp miss of the black level is generated by switching the substrate voltage Vsub and the signal shading is produced in an image has been already described in connection with FIG. 12, thereby eliminating its detailed explanation.

A fourth embodiment according to the present invention will now be described.

Figures 21, 22:
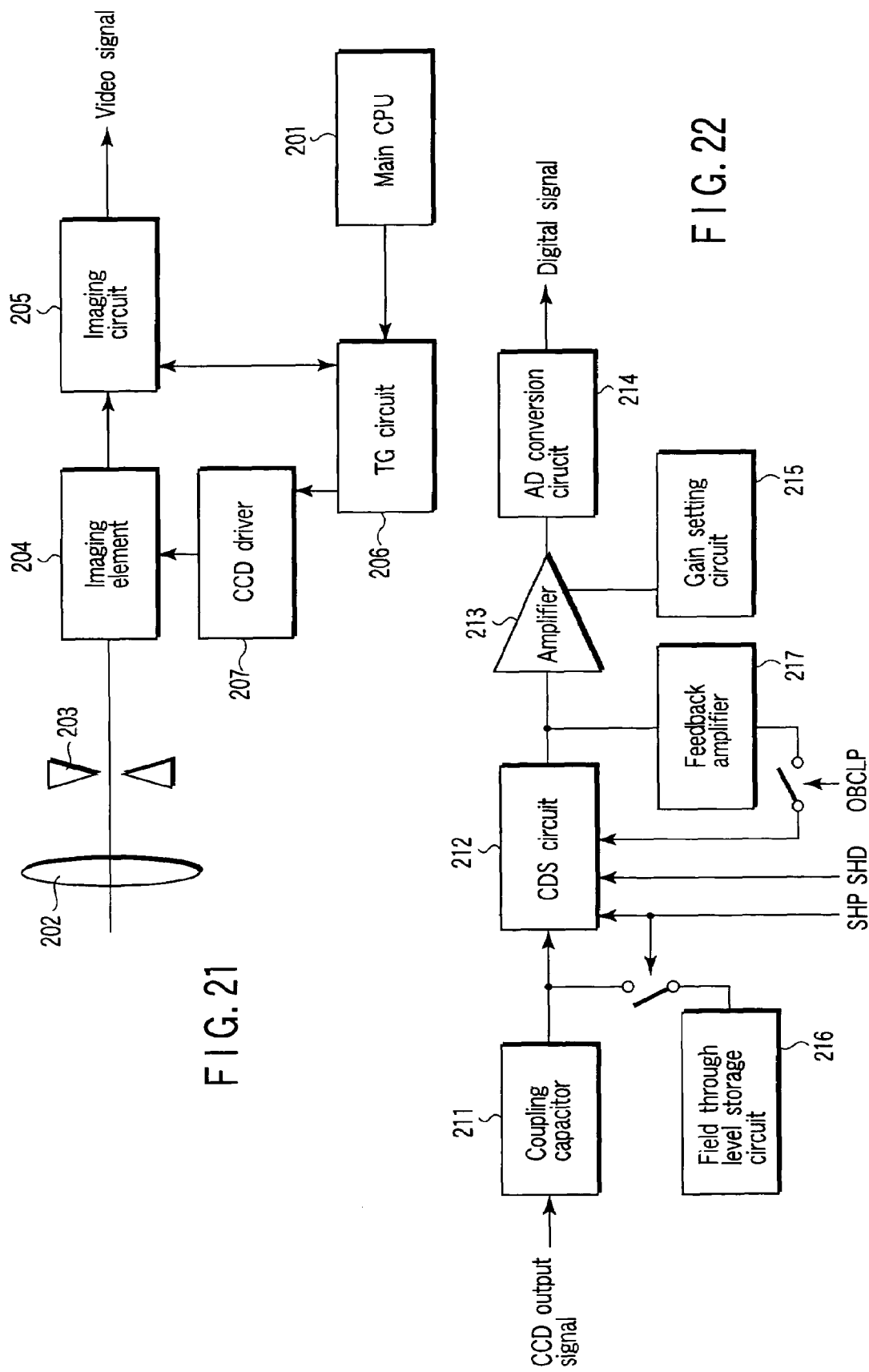
FIG. 21 is a block diagram showing a structure of an electronic camera according to a fourth embodiment of the present invention.
FIG. 22 is a view showing a circuit configuration around a correlative double sampling circuit.

FIG. 21 is a block diagram showing a structure of an electronic camera according to the fourth embodiment of the present invention.

This electronic camera includes a main CPU 201, a lens 202, an aperture mechanism 203, an imaging element 204, an imaging circuit 205, a TG circuit 206, and a CCD driver 207.

The main CPU 201 entirely controls the respective portions. The aperture mechanism 203 controls the exposure. The imaging element 204 converts an object field light into an electrical signal. The imaging circuit 205 converts the signal from the imaging element 204 into a video signal. The TG circuit 206 generates a drive timing signal for the imaging element 204. The CCD driver 207 controls a transfer operation of the imaging element 204.

In this electronic camera, the main CPU 201 entirely performs all the controls, and it is in charge of a series of processing concerning a reading control over a signal from the imaging element 204, image processing, and an exposure control.

FIG. 22 is a view showing a circuit configuration around a correlative double sampling circuit in the imaging circuit.

After a direct-current component is removed from a CCD output signal through a coupling capacitor 211, noises are reduced in a CDS (correlative double sampling) circuit 212. Then, this signal is amplified by an amplifier 213, converted into a digital signal by an AD conversion circuit 214, and subjected to signal processing on a next stage. Here, an amplification factor of the amplifier 213 specified by the main CPU 201 is informed to a gain setting circuit 215 and set in the amplifier 213.

Of CCD output waveforms, the CDS circuit 212 takes a difference in CCD output level between a period in which electric charges are reset (field through period) and a period in which a signal is outputted (signal period), thereby reducing noises.

Thus, a field through level storage circuit 216 stores a signal level in the field through period by using a sample-hold pulse SHP outputted in the field through period. Then, the CDS circuit 212 acquires a signal level in the signal period by using a sample-hold pulse SHD outputted in the signal period, and calculates a level difference.

Additionally, a signal in an optical black portion of the CCD output waveforms is fed back to the CDS circuit 212 through a feedback amplifier 217 and processed as a reference signal of a black level in a period that an optical black clamp pulse OBCLP is outputted.

Figure 23:
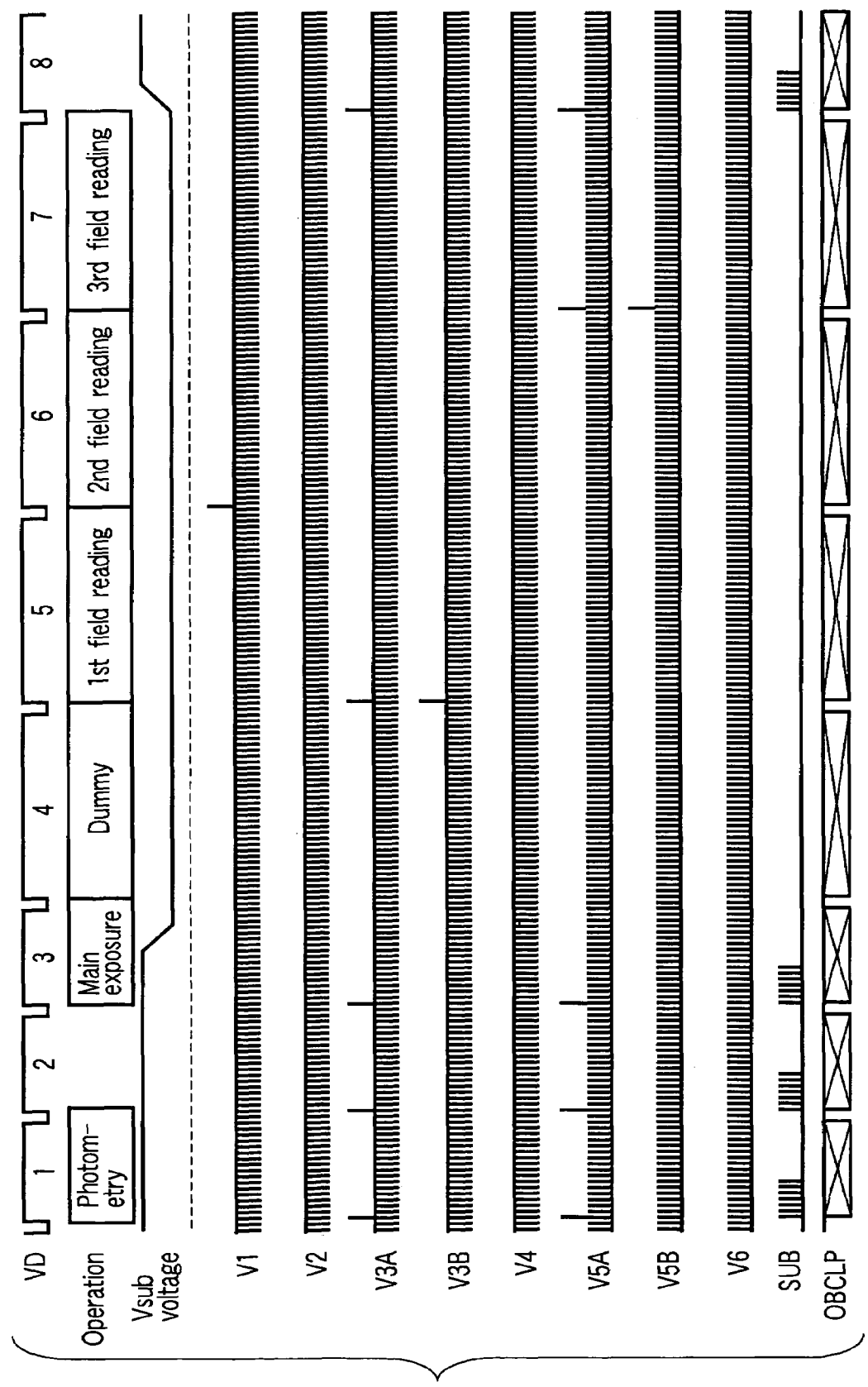
FIG. 23 is a timing chart showing an operation of the fourth embodiment of the electronic camera according to the present invention.

FIG. 23 is a timing chart showing an operation of the fourth embodiment of the electronic camera according to the present invention. An interval of a vertical synchronization signal VD is called a frame period, and numbers are given in FIG. 23 in order to specify the frame period. In the fourth embodiment, a difference from the prior art lies in that a later-described dummy operation is effected by providing a new frame period between the main exposure operation and the first field read operation.

When a camera operator performs a release operation, the photometry is carried out in a first frame period, and shooting conditions such as an aperture, an exposure time and others are determined based on this photometric value. Then, in a third frame period, exposure for still picture shooting is carried out. In this third frame period, the shooting mode is switched from a monitor mode to a still mode, a substrate voltage Vsub is switched to a low voltage, and a mechanical shutter is closed.

In a fourth frame period, as different from the conventional operation, electric charges are not read from photodiodes of the imaging element 204, and a dummy operation that electric charges are just transferred at a normal speed by operations of vertical drive signals V1 to V6 from a CCD driver 207 is continued.

Here, transferring at a normal speed does not mean that electric charges are transferred based on a so-called high-speed transfer that electric charges are collectively transferred for flushing, but means that electric charges are transferred at a speed of reading electric charges for displaying an image or the like. A frame period in which the dummy operation is continued like the fourth frame period will be referred to as a dummy period hereinafter.

Further, even in this dummy operation, the TG circuit 206 continues the clamp operation of the black level by operating the optical black clamp pulse OBCLP.

Then, in a fifth frame period, high-voltage pulses are applied to vertical drive signals V3A and V3B, and electric charge reading in the first field and the transfer operation are executed. Furthermore, in a sixth frame period, high-voltage pulses are applied to a vertical drive signal V1, and electric charge reading in the second field and the transfer operation are carried out. Moreover, in a seventh frame period, high-voltage pulses are applied to vertical drive signals V5A and V5B, and electric charge reading in the third field and the transfer operation are carried out.

In an eighth frame period, the shooting mode is switched from the still mode to the monitor mode, and the substrate voltage Vsub is switched to a high voltage.

In the fourth embodiment, a difference from the prior art lies in that a dummy operation is performed by providing a new frame period between the main exposure operation and the first field read operation. Since flushing of unnecessary electric charges in a vertical transfer path is satisfactorily performed by this dummy operation, occurrence of smear can be suppressed. Further, the clamp operation of the black level is continued by successively operating the optical black clamp pulse OBCLP in accordance with this dummy operation. As a result, the follow-up operation of the clamp circuit is stabilized in the dummy period, a clamp miss due to a signal level difference of the CCD outputs can be avoided, and the signal shading can be suppressed.

A fifth embodiment according to the present invention will now be described.

Figure 24A:
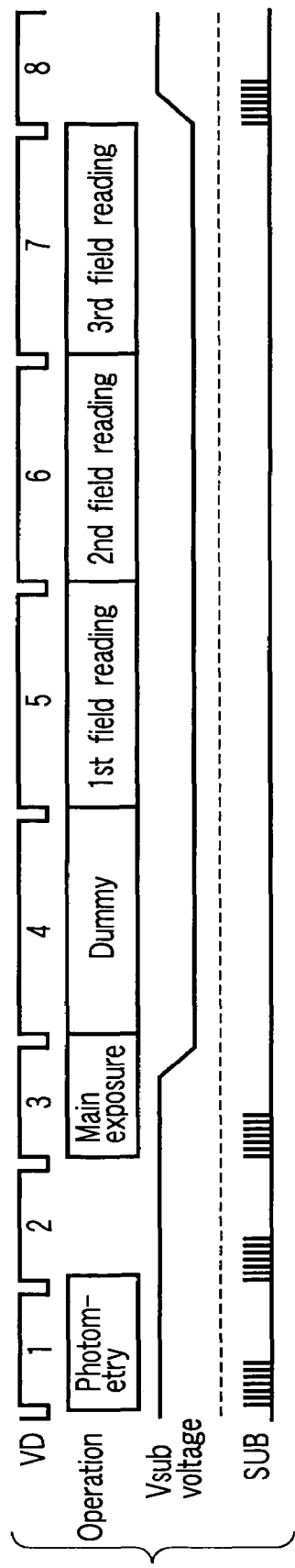
FIGS. 24A, 24B, 24C and 24D are timing charts showing an operation of an electronic camera according to a fifth embodiment of the present invention.
Figure 24B:
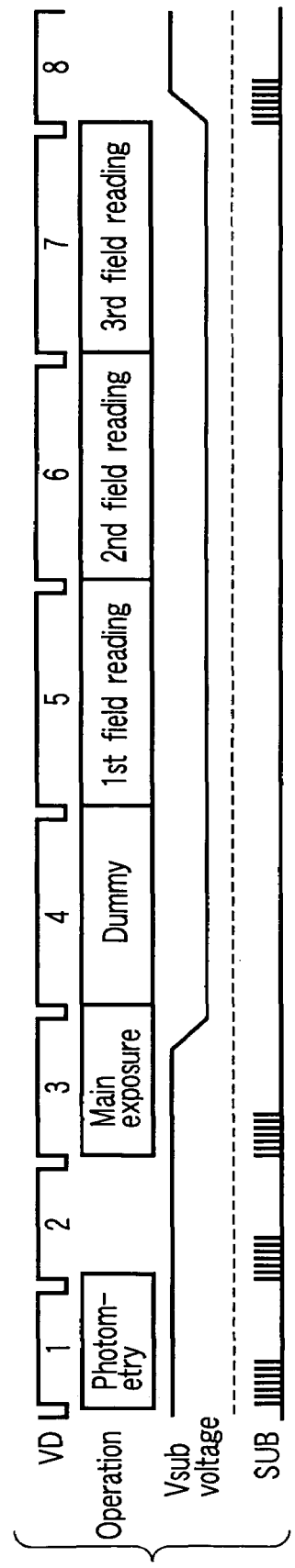
Figure 24C:
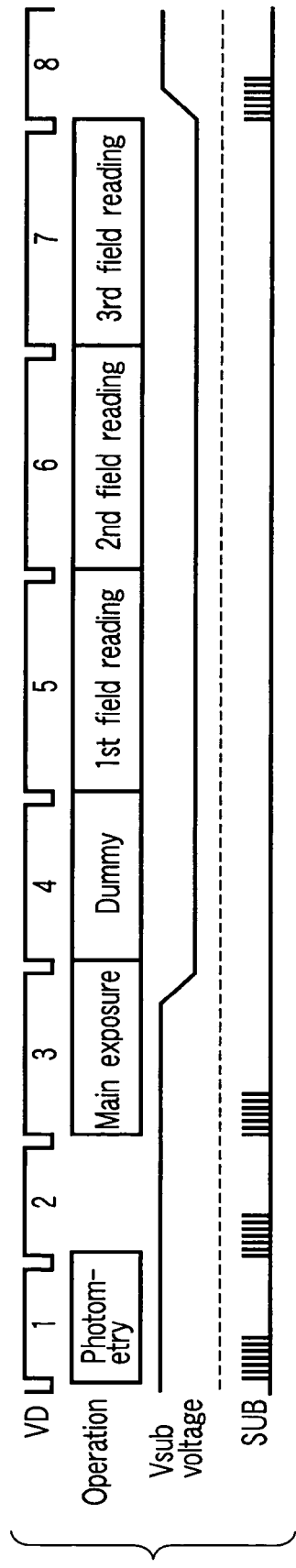
Figure 24D:
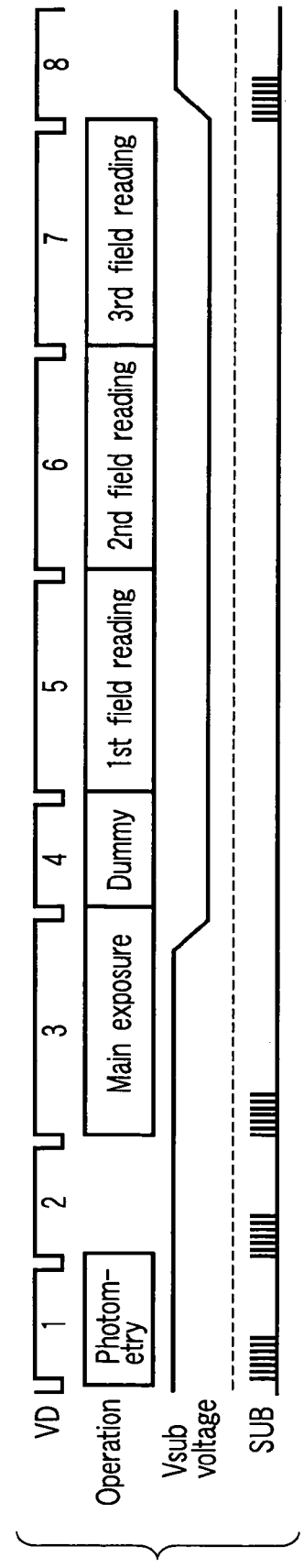

FIGS. 24A to 24D are timing charts showing an operation of the fifth embodiment of an electronic camera according to the present invention. A difference of this embodiment from the foregoing embodiment lies in that a dummy period length of the fourth embodiment is changed in accordance with the brightness of an object. FIG. 24A shows a timing chart when the brightness of an object is high, and the dummy period is controlled to be shorter as the brightness of the object is lowered from FIG. 24B to FIG. 24D.

When a camera operator performs a release operation, the photometry is carried out in a first frame period, shooting conditions such as an aperture, an exposure time and others are determined based on this photometric value, and a dummy period length is determined. Furthermore, in a third frame period, the main exposure is carried out. In this third frame period, the shooting mode is switched from the monitor mode to the still mode, a substrate voltage Vsub is switched to a lower voltage, and a mechanical shutter is closed like the fourth embodiment.

In a fourth frame period, electric charges are not read from an imaging element 204 like the fourth embodiment. A dummy operation that electric charges are just transferred at a normal speed by operations of vertical drive signals (V1 to V6) from a CCD driver 207 is continued. This dummy period length, i.e., a time that the dummy operation is continued is set longer if the brightness of an object is high and set shorter if the brightness of an object is low. Here, the dummy period length may be continuously changed in accordance with the brightness of an object, or it may be changed in steps. Moreover, the dummy period length may be determined based on the main exposure time in such a manner that a total time of the third frame period and the fourth frame period becomes a substantially predetermined value.

It is to be noted that the TG circuit 206 continues the clamp operation of the black level by operating the optical black clamp pulse OBCLP even in the dummy operation like the fourth embodiment. Additionally, in the fifth to eighth frame periods, the same operation as that in the fourth embodiment is carried out.

When the brightness of an object is high, it can be estimated that a quantity of unnecessary electric charges remaining in a vertical transfer path is large. Therefore, according to the fifth embodiment, flushing of unnecessary electric charges can be assuredly performed by determining the dummy period length in accordance with the brightness of an object. Further, since the follow-up operation of the clamp circuit is stabilized in the dummy period, a clamp miss due to a signal level difference of CCD outputs can be avoided, and the signal shading can be suppressed.

A sixth embodiment according to the present invention will now be described.

FIGS. 25A and 25B are timing charts showing an operation of the sixth embodiment of an electronic camera according to the present invention. In this embodiment, a difference from the fourth embodiment lies in that a dummy period length is set shorter in a rapid sequence mode than that in a one-shot mode. FIG. 25A shows a timing chart in the one-shot mode, and FIG. 25B shows a timing chart in the rapid sequence mode.

In the rapid sequence mode of FIG. 25B, when a camera operator performs a release operation, the photometry is carried out in a first frame period, shooting conditions such as an aperture, an exposure time and others are determined based on this photometric value, and a dummy period length is determined. At this time, when the shooting mode is the rapid sequence mode, the shorter dummy time than that in the one-shot mode is set.

Furthermore, in a third frame period, the main exposure is performed. In this third frame period, the shooting mode is switched from the monitor mode to the still mode, the substrate voltage Vsub is switched to a low voltage, and a mechanical shutter is closed like the fourth embodiment.

In a fourth frame period, like the fourth embodiment, electric charges are not read from an imaging element 24, and a dummy operation that electric charges are transferred at a normal speed by operations of vertical drive signals (V1 to V6) from a CCD driver 207 is continued. Like the fourth embodiment, a TG circuit 206 continues the clamp operation of the black level by operating the optical black clamp pulse OBCLP even in this dummy operation. Moreover, in fifth to eighth frame periods, the same operation as that in the fourth embodiment is effected.

Additionally, the photometry which is the operation in the first frame period is not again carried out from a ninth period, and the operations from the third frame period to the eighth frame period are repeated until end of shooting.

In the sixth embodiment, a dummy period length in the rapid sequence mode is set shorter than a dummy period length in any other mode. Therefore, unnecessary electric charges can be effectively flushed without preventing the rapid sequence operation. Further, the follow-up operation of the clamp circuit is stabilized in the dummy period. Therefore, a clamp miss due to a signal level difference of CCD outputs can be prevented, and the signal shading can be suppressed.

A seventh embodiment according to the present invention will now be described.

Figure 26A:
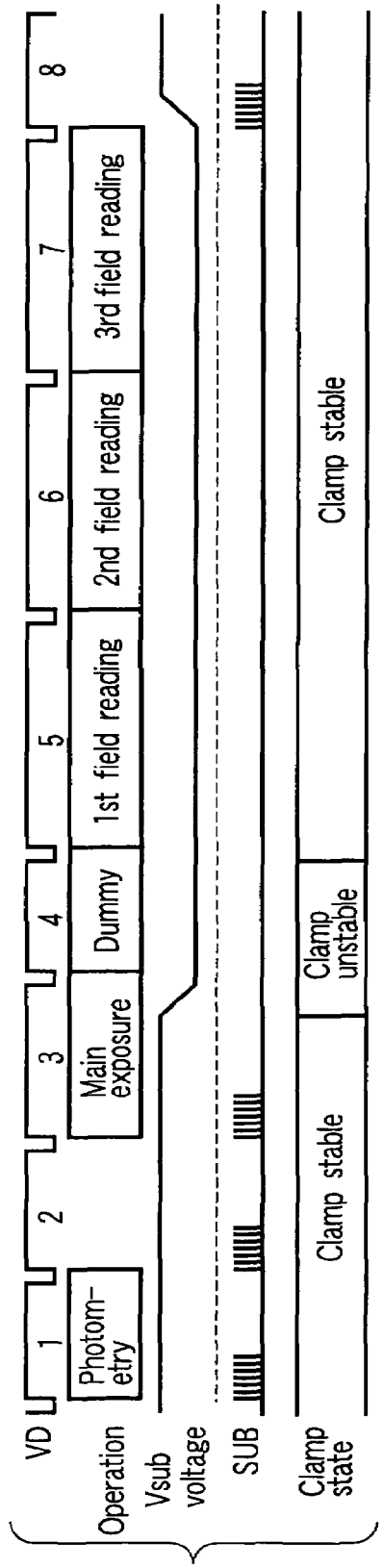
FIGS. 26A and 26B are timing charts showing an operation of an electronic camera according to a seventh embodiment of the present invention.
Figure 26B:
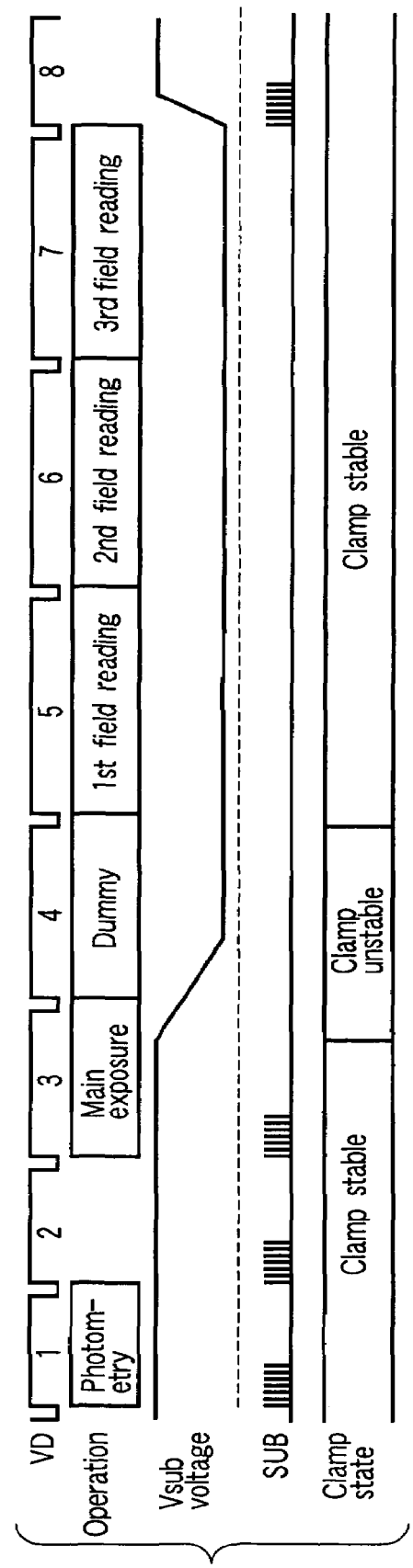

FIGS. 26A and 26B are timing charts showing an operation of the seventh embodiment of an electronic camera according to the present invention. In this embodiment, a difference from the fourth embodiment lies in that a dummy period length is determined in accordance with a time until the clamp operation of the black level is stabilized, i.e., a clamp convergence time. FIG. 26A is a timing chart when the clamp convergence time is short. FIG. 26B is a timing chart when the clamp convergence time is long.

Here, the clamp convergence time generally depends on a magnitude of a level difference when the substrate voltage Vsub is switched. That is, it largely varies depending on a switched voltage of the substrate voltage Vsub. On the other hand, the switched voltage of the substrate voltage Vsub is determined as an appropriate value based on a type of the imaging element 204 and a type of the electronic camera.

Therefore, according to the seventh embodiment, flushing of unnecessary electric charges can be appropriately performed by using an appropriate dummy period predetermined in accordance with each electronic camera. Further, since the follow-up operation of the clamp circuit is stabilized in the dummy period, a clamp miss due to a signal level difference of CCD outputs can be avoided, thereby suppressing the signal shading.

An eighth embodiment according to the present invention will now be described.

FIGS. 27A and 27B are timing charts showing an operation of the eighth embodiment of an electronic camera according to the present invention. This embodiment is different from the fourth embodiment in that a dummy period length is determined in accordance with a longer one of a time until the clamp operation of the black level is stabilized, i.e., a clamp convergence time and a time required for flushing of unnecessary electric charges. Here, FIG. 27A is a timing chart when the clamp convergence time is longer than the time required for flushing of unnecessary electric charges. FIG. 27B is a timing chart when the clamp convergence time is shorter than the time required for flushing of unnecessary electric charges.

When a camera operator performs a release operation, the photometry is carried out in a first frame period, and shooting conditions such as an aperture, an exposure time and others are determined based on this photometric value. Then, the clamp convergence time is compared with the time required for flushing of unnecessary electric charges. As shown in FIG. 27A, when the clamp convergence time is longer than the time required for flushing of unnecessary electric charges, a dummy period length is determined in accordance with the clamp convergence time. As shown in FIG. 27B, when the clamp convergence time is shorter than the time required for flushing of unnecessary electric charges, the dummy period length is determined in accordance with the time required for flushing of unnecessary electric charges.

Furthermore, the main exposure is carried out in a third frame period. In this third frame period, the shooting mode is switched from the monitor mode to the still mode, the substrate voltage Vsub is switched to a low voltage, and a mechanical shutter is closed.

In a fourth frame period, in the dummy period determined as described above, like the fourth embodiment, electric charges are not read from an imaging element 204, but a dummy operation that electric charges are just transferred at a normal speed by operations of vertical drive signals V1 to V6 from a CCD driver 207 is continued. Moreover, even in this dummy operation, a TG circuit 206 continues the clamp operation of the black level by operating an optical black clamp pulse OBCLP. Then, even in fifth to eighth frame periods, the same operation as that of the fourth embodiment is carried out.

According to the eighth embodiment, even if at least one of the clamp convergence time and the time required for flushing of unnecessary electric charges is configured to be variable in accordance with shooting conditions, flushing of unnecessary electric charges can be appropriately effected by using an adequate dummy period length. Additionally, since the follow-up operation of the clamp circuit is stabilized in the dummy period, a clamp miss due to a signal level difference of CCD outputs can be avoided, and the signal shading can be suppressed.

A ninth embodiment according to the present invention will now be described.

Figure 28:
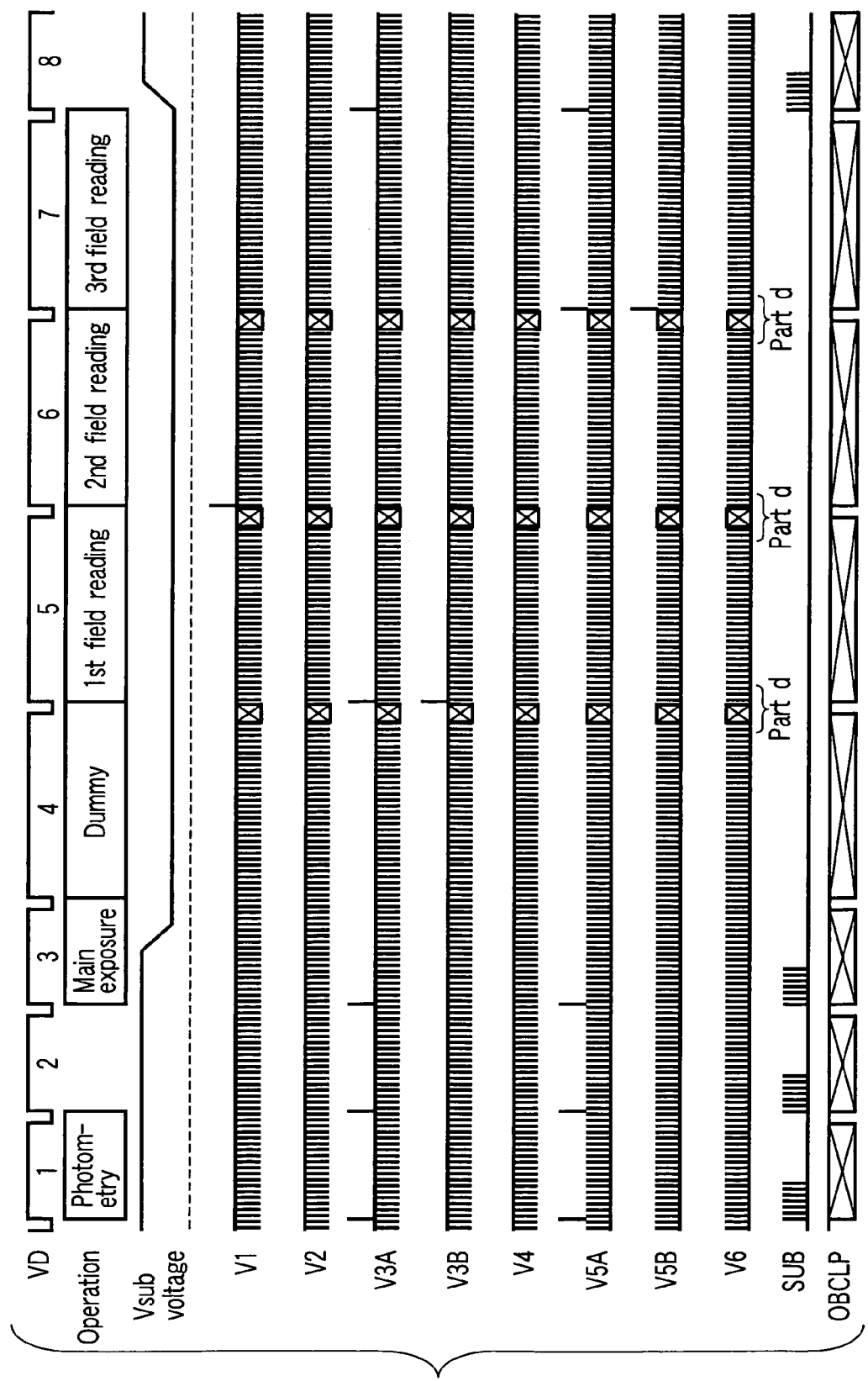
FIG. 28 is a timing chart showing an operation of an electronic camera according to a ninth embodiment of the present invention.

FIG. 28 is a timing chart showing an operation of the ninth embodiment of an electronic camera according to the present invention. This embodiment is different from the fourth embodiment in that an electric charge transfer operation at a normal speed and a high-speed transfer operation are combined with each other.

The operations in first to third frame periods are the same as those in the fourth embodiment. Further, in a fourth frame period, the above-described dummy operation is continued for a predetermined time, and the high-speed transfer operation (part d) is then carried out. Thereafter, electric charges in a first field are read in a fifth frame period. Furthermore, the high-speed transfer operation (part d) is performed after the transfer operation of the read electric charges in the fifth frame period, and then electric charges in a second field are read in a sixth frame period. Likewise, the high-speed transfer operation (part d) is conducted after the transfer operation of the read electric charges in the sixth frame period, and reading of electric charges in a third field and an electric charge transfer operation are performed in a seventh frame period.

The ninth embodiment is configured to flush unnecessary electric charges by performing the electric charge transfer operation at a normal speed and a high-speed transfer operation before reading operations for the first to third fields. Therefore, since flushing of unnecessary electric charges is performed in advance by the electric charge transfer operation at a normal speed, the unnecessary electric charge flushing operation can be assuredly executed even if the efficiency of the high-speed transfer is poor. Comparing with the first to eighth embodiments, a combination with the high-speed transfer operation can shorten the dummy period length. Moreover, flushing of a dark current in a vertical transfer path can be effected by the high-speed transfer before the reading operation for the first to third fields. Additionally, since the follow-up operation of the clamp circuit is stabilized in the dummy period, a clamp miss due to a signal level difference of CCD outputs can be avoided, and the signal shading can be suppressed.

It is to be noted that the operations of the foregoing embodiments may be realized by being incorporated as programs in the main CPUs 1, 101 and 201, or they may be constituted by individually using hardware. Further, each function may be divided, and the main CPUs 1, 101 and 201 may be combined with hardware.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An electronic camera comprising:
   an n:1 (n is a natural number not less than 3) interlace read type imaging element which can read electric charges of a plurality of two-dimensionally arranged photodiodes to the outside through a transfer path;
   an unnecessary electric charge flushing portion used to transfer unnecessary electric charges stored in the transfer path at a normal speed through the transfer path;
   a signal read portion which reads the electric charges of the photodiodes to the outside of the imaging element after flushing the unnecessary electric charges; and
   a conversion portion which converts a signal read by the signal read portion into a video signal,
   wherein the unnecessary electric charge flushing portion transfers the unnecessary electric charges stored in the transfer path at a normal speed through the transfer path in a period after end of exposure of the imaging element before reading the electric charges of the photodiode to the transfer path,
   wherein the normal speed corresponds to a speed of reading the electric charges.

2. The electronic camera according to claim 1, further comprising a clamp portion which clamps a black level of the video signal while the unnecessary electric charge flushing portion flushes the unnecessary electric charges.

3. The electronic camera according to claim 2, wherein the unnecessary electric charge flushing portion determines the period to transfer the unnecessary electric charges in accordance with brightness of an object.

4. The electronic camera according to claim 2, wherein the electronic camera has a rapid sequence mode, and the unnecessary electric charge flushing portion sets the period to transfer the unnecessary electric charges when taking pictures in the rapid sequence mode shorter than that when transferring the unnecessary electric charges in any other mode.

5. The electronic camera according to claim 2, wherein the unnecessary electric charge flushing portion determines the period to transfer the unnecessary electric charges in accordance with a time required for a clamp operation of the clamp portion to be stabilized.

6. The electronic camera according to claim 2, wherein the unnecessary electric charge flushing portion determines the period to transfer the unnecessary electric charges based on a longer one of a time required to completely flush the unnecessary electric charges and a time required for the clamp operation to be stabilized.

7. The electronic camera according to claim 1, wherein the unnecessary electric charge flushing portion determines the period to transfer the unnecessary electric charges in accordance with the brightness of an object.

8. The electronic camera according to claim 1, wherein the electronic camera has a rapid sequence mode, and the unnecessary electric charge flushing portion sets the period to transfer the unnecessary electric charges when taking pictures in the rapid sequence mode shorter than that when transferring the unnecessary electric charges in any other mode.

9. An electronic camera comprising:
an n:1 (n is a natural number not less than 3) interlace read type imaging element which can read electric charges of a plurality of two-dimensionally arranged photodiodes to the outside through a transfer path;
an unnecessary electric charge flushing portion used to transfer unnecessary electric charges stored in the transfer path at a normal speed through the transfer path;
a signal read portion which reads the electric charges of the photodiodes to the outside of the imaging element after flushing the unnecessary electric charges; and
a conversion portion which converts a signal read by the signal read portion into a video signal,
wherein the unnecessary electric charge flushing portion has a frame period in which the unnecessary electric charges stored in the transfer path are transferred at a normal speed through the transfer path after end of exposure of the imaging element and before reading the electric charges of the photodiodes to the transfer path,
wherein the normal speed corresponds to a speed of reading the electric charges.

10. The electronic camera according to claim 9, further comprising a clamp portion which clamps a black level of the video signal while the unnecessary electric charge flushing portion is flushing the unnecessary electric charges.

11. The electronic camera according to claim 10, wherein the unnecessary electric charge flushing portion determines the frame period to transfer the unnecessary electric charges in accordance with brightness of an object.

12. The electronic camera according to claim 10, wherein the electronic camera has a rapid sequence mode, and the unnecessary electric charge flushing portion sets the frame period to transfer the unnecessary electric charges when taking pictures in the rapid sequence mode shorter than that when transferring the unnecessary electric charges in any other mode.

13. The electronic camera according to claim 10, wherein the unnecessary electric charge flushing portion determines the frame period to transfer the unnecessary electric charges in accordance with a time required for a clamp operation of the clamp portion to be stabilized.

14. The electronic camera according to claim 10, wherein the unnecessary electric charge flushing portion determines the frame period to transfer the unnecessary electric charges based on a longer one of a time required to completely flush the unnecessary electric charges and the time required for the clamp operation to be stabilized.

15. The electronic camera according to claim 9, wherein the unnecessary electric charge flushing portion determines the frame period to transfer the unnecessary electric charges in accordance with brightness of an object.

16. The electronic camera according to claim 9, wherein the electronic camera has a rapid sequence mode, and the unnecessary electric charge flushing portion sets the frame period to transfer the unnecessary electric charges when taking pictures in the rapid sequence mode shorter than that when transferring the unnecessary electric charges in any other mode.

* * * * *